United States Patent
Kim et al.

(10) Patent No.: US 9,134,905 B2
(45) Date of Patent: Sep. 15, 2015

(54) MOBILE TERMINAL AND METHOD OF ORGANIZING A MENU SCREEN THEREIN

(75) Inventors: Jungwoo Kim, Seoul (KR); Mijun Yoo, Seoul (KR); Hyunho Kang, Yongin-si (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 13/024,175

(22) Filed: Feb. 9, 2011

(65) Prior Publication Data
US 2012/0017177 A1   Jan. 19, 2012

(30) Foreign Application Priority Data
Jul. 16, 2010   (KR) .......................... 10-2010-0069239

(51) Int. Cl.
*G06F 3/048* (2013.01)
*G06F 3/0488* (2013.01)
*G06F 3/0486* (2013.01)

(52) U.S. Cl.
CPC .......... *G06F 3/04886* (2013.01); *G06F 3/0486* (2013.01)

(58) Field of Classification Search
CPC ........... G01C 21/3664; H04N 21/4316; G06F 3/0488; G06F 3/04817; G06F 3/0482; G06F 3/04886
See application file for complete search history.

(56) References Cited

U.S. PATENT DOCUMENTS

| | | | | |
|---|---|---|---|---|
| 6,166,736 A | * | 12/2000 | Hugh | 715/798 |
| 7,263,670 B2 | * | 8/2007 | Rekimoto | 715/837 |
| 2005/0108655 A1 | * | 5/2005 | Andrea et al. | 715/798 |
| 2008/0189653 A1 | * | 8/2008 | Taylor et al. | 715/792 |
| 2009/0006991 A1 | * | 1/2009 | Lindberg et al. | 715/763 |
| 2009/0138827 A1 | * | 5/2009 | Van Os et al. | 715/846 |
| 2009/0178008 A1 | | 7/2009 | Herz et al. | |
| 2009/0213086 A1 | * | 8/2009 | Chae et al. | 345/173 |
| 2010/0295789 A1 | * | 11/2010 | Shin et al. | 345/168 |

FOREIGN PATENT DOCUMENTS

| | | |
|---|---|---|
| CN | 101452363 A | 6/2009 |
| CN | 101667098 A | 3/2010 |
| EP | 1870801 A1 | 12/2007 |
| WO | WO 2009/089222 A2 | 7/2009 |

OTHER PUBLICATIONS

HTC Hero User Manual 2009.*
"360DeskTop," found online at: http://www.newhua.com/2009/0814/71521.shtml, Aug. 14, 2009, (11 pages).

* cited by examiner

*Primary Examiner* — Boris Pesin
*Assistant Examiner* — Ayesha Huertas Torres
(74) *Attorney, Agent, or Firm* — Birch, Stewart, Kolasch & Birch, LLP

(57) ABSTRACT

A mobile terminal and method of organizing a menu screen therein are disclosed, by which a menu item can be rearranged in a manner of shifting the menu item located on a first line to another line except the first line. The present invention includes displaying the menu screen including a plurality of lines, each having at least one menu item arranged therein, receiving an input of a touch and drag action from a first point of a first line included in a plurality of the lines to a second point of a second line included in a plurality of the lines, and if receiving the input of the touch and drag action, arranging a first menu item having the first point belong thereto in a manner of shifting the first menu item to a position corresponding to the second point in the second line.

21 Claims, 35 Drawing Sheets

(a)            (b)

(a)                        (b)

(a)

(b)

(a)   (b)

MOBILE TERMINAL AND METHOD OF ORGANIZING A MENU SCREEN THEREIN

CROSS-REFERENCE TO RELATED APPLICATIONS

Pursuant to 35 U.S.C. §119(a), this application claims the benefit of earlier filing date and right of priority to Korean Application No. 10-2010-0069239, filed on Jul. 16, 2010, the contents of which are hereby incorporated by reference herein in their entirety.

BACKGROUND OF THE INVENTION

1. Field of the Invention

The present invention relates to a mobile terminal, and more particularly, to a mobile terminal and method of organizing a menu screen therein. Although the present invention is suitable for a wide scope of applications, it is particularly suitable for performing a function related to organization of a menu screen including a plurality of menu items.

2. Description of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Generally, in displaying a menu screen, a mobile terminal according to a related art is able to display a menu item list of a text type or an icon type. Moreover, when a prescribed menu item is shifted to a second position from a first position, the mobile terminal shifts a different menu item displayed at the second position to another line due to the shifted prescribed menu item without changing a size of the menu item.

However, according to the related art, a position of a previously arranged menu item is unintentionally changed due to the menu item shift.

Moreover, in case that the number of menu items on a specific line is incremented or decremented due to the menu item shift, it is unable to adjust a size of the menu item despite that a display area of the menu item is increased or decreased.

BRIEF SUMMARY OF THE INVENTION

Accordingly, the present invention is directed to a mobile terminal and method of organizing a menu screen therein that substantially obviate one or more problems due to limitations and disadvantages of the related art.

An object of the present invention is to provide a mobile terminal and method of organizing a menu screen therein, by which a menu item can be rearranged in a manner of shifting the menu item located on a first line to another line except the first line.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen configured to display a menu screen including a plurality of lines, each having at least one menu item arranged therein and a controller, if receiving an input of a touch and drag action from a first point of a first line included in a plurality of the lines to a second point of a second line included in a plurality of the lines, arranging a first menu item having the first point belong thereto in a manner of shifting the first menu item to a position corresponding to the second point in the second line. And, a prescribed one of a plurality of the lines includes a non-shiftable image region as a corresponding menu item. Moreover, the second line includes the first menu item in addition to the at least one menu item included before the arrangement of the first menu item.

In another aspect of the present invention, a method of organizing a menu screen in a mobile terminal includes the steps of displaying the menu screen including a plurality of lines, each having at least one menu item arranged therein, receiving an input of a touch and drag action from a first point of a first line included in a plurality of the lines to a second point of a second line included in a plurality of the lines, and if receiving the input of the touch and drag action, arranging a first menu item having the first point belong thereto in a manner of shifting the first menu item to a position corresponding to the second point in the second line. And, a prescribed one of a plurality of the lines includes a non-shiftable image region as a corresponding menu item. Moreover, the second line includes the first menu item in addition to the at least one menu item included before the arrangement of the first menu item.

Accordingly, the present invention provides the following effects and/or advantages.

First of all, in case that a first menu item on a first line is shifted to a second line to be arranged thereon, the present invention is able to adjust a per-menu item horizontal length ratio of the first line to the second line.

Secondly, in case that a first menu item on a first line is shifted to a second line to be arranged thereon, the first menu item is deleted from the first line and can be then added to the second line.

Thirdly, in case that a first menu item on a first line is shifted to a second line to be arranged thereon, since the first menu item can be included in addition to a menu item previously included in the second line, the menu item previously included in the second line is not shifted to another line due to the arrangement of the first menu item.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
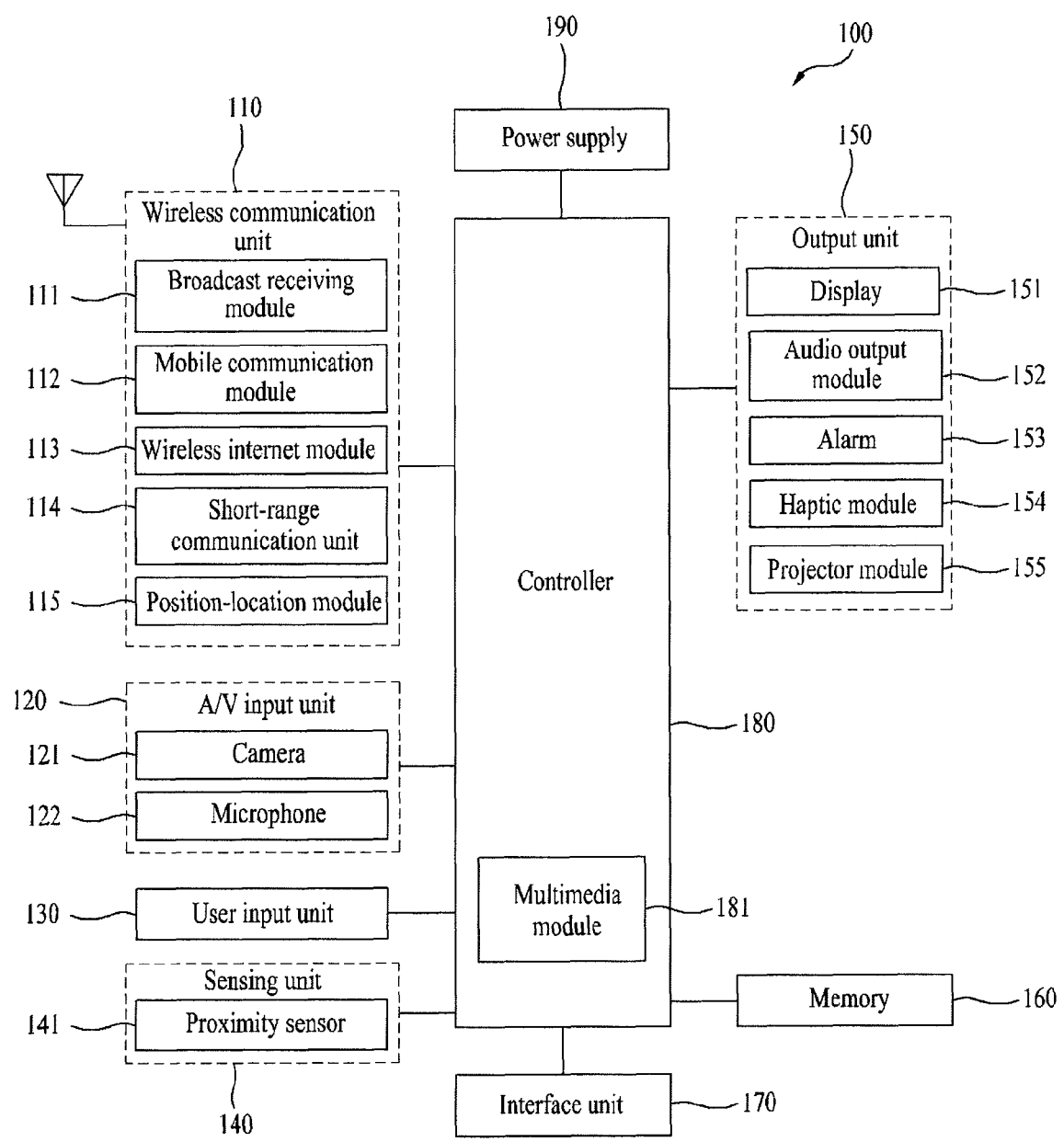
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN(Wireless LAN) (Wi-Fi), Wibro (Wireless broadband), Wimax (World Interoperability for Microwave Access), HSDPA(High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Interconnected operational mechanism between the display unit 151 and the touchpad (not shown) is explained with reference to FIG. 2 as follows.

Figure 2:
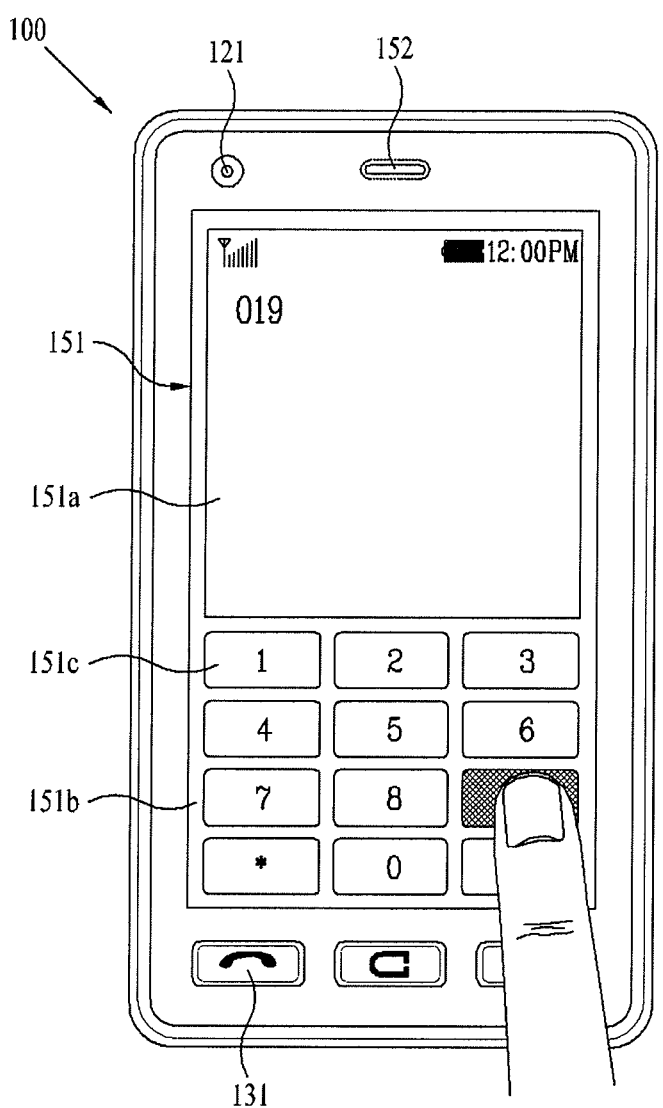
FIG. 2 is a front diagram of a mobile terminal according to one embodiment of the present invention, in which one operational state of the mobile terminal is shown.

FIG. 2 is front-view diagram of a terminal according to one embodiment of the present invention for explaining an operational state thereof.

First of all, various kinds of visual information can be displayed on the display unit 151. The information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 2 shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

First of all, a mobile terminal mentioned in the following description can include at least one of the components shown in FIG. 1. Moreover, a mobile terminal can include a touchscreen for example of a display unit 151. In this case, the touchscreen is indicated by a reference number 151 in the following description as well.

A menu item mentioned in this disclosure can include an item that indicates an application or function executable in the mobile terminal 100. Therefore, if a specific menu item is selected by a user, the mobile terminal 100 is able to execute the application or function corresponding to the selected specific menu item.

A menu screen mentioned in this disclosure can include a screen including a plurality of menu items. And, a plurality of the menu items can be displayed in a manner of being included in at least one line.

According to the present invention, the mobile terminal 100 is able to configure a plurality of menu screens and is also able to display a plurality of the menu screens on a plurality of pages, respectively.

For instance, the mobile terminal 100 is able to display first to Nth menu screens on first to Nth pages, respectively. If a page turning action is performed, the mobile terminal 100 is able to provide a menu screen displayed on another page.

In the following description, a menu screen organization is explained in detail with reference to the accompanying drawings.

Figure 3A:
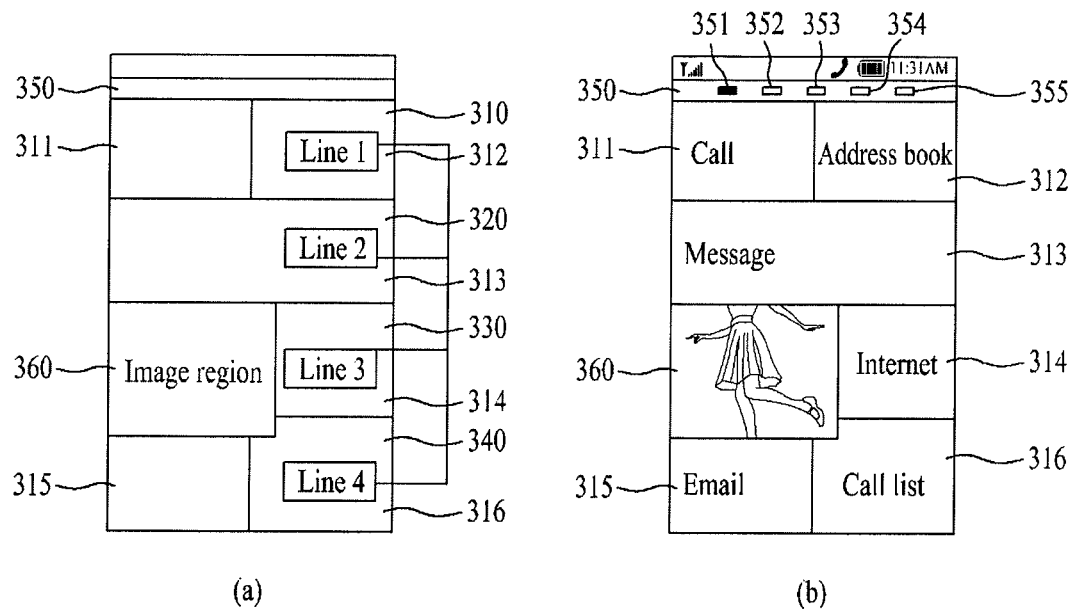
FIG. 3A to FIG. 3C are diagrams of screens on which basic configurations of a menu screen according to the present invention are displayed.
Figure 3B:
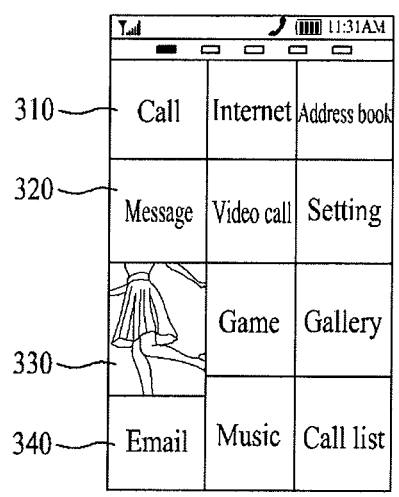

FIG. 3A and FIG. 3B are diagrams of screens on which basic configurations of a menu screen according to the present invention are displayed.

Referring to FIG. 3A, a menu screen includes a plurality of lines 310 to 340. And, at least one menu item 311 to 316 can be included in each of a plurality of the lines 310 to 340.

For instance, referring to FIG. 3A (b), 'call' 311 and 'address book' 312 are included in the first line 310, 'message' 313 is included in the second line 320, an image region 360 and 'Internet' 314 are included in the third line 330, and 'email' 315 and 'call list' 316 are included in the fourth line 340.

The menu screen is able to further include a page indicator region 350. In case that a plurality of menu screens include a plurality of pages, a plurality of page indicators 351 to 355 respectively corresponding to a plurality of the pages can be displayed in the page indicator region 250.

For instance, if a menu screen is currently displayed on a first page, a first page indicator 351 corresponding to the first page can be distinguishably displayed.

The image region 360 can be included as a menu item, which is included in a prescribed line (e.g., the third line 330 shown in FIG. 3A), in the prescribed line among a plurality of the lines 310 to 340. In particular, at least one image region 360 can be included in one menu screen.

In this case, the image region 360 can be configured non-shiftable unlike the menu items. And, a size of the image region 360 is adjustable according to a user setting.

For instance, a specific image can be displayed on the image region 360. The specific image can include a representative image indicating a menu screen having the image region 360 included therein. The specific image can be displayed on the image region 360 entirely or in part. And, a size of the image region 360 is changeable according to a user selection.

The mobile terminal 100 is able to further include a general indicator region. And, terminal status information (e.g., remaining battery quantity, date/hour information, signal strength, etc.) can be displayed on the general indicator region.

In the menu screen shown in FIG. 3B, menu items are included as many as the maximum number of menu items (i.e., the image region 360 is included as one of the menu items) that can be included in each line.

For instance, the maximum number of lines, which can be included in one menu screen, is 4 (e.g., the lines 310 to 340) and the maximum number of menu items, which can be included in one line, can be 3. Hence, in the menu screen shown in FIG. 3B, maximum twelve menu items, and more specifically, eleven menu items and one image region can be included.

In this case, a per-line vertical length ratio or a per-menu item horizontal length ratio is set as a default, is automatically set by the terminal, or can be set according to a user selection. Moreover, the image region 360 can be displayed in an independent size or by a size ratio irrespective of the per-menu item horizontal length of the corresponding line or the per-line vertical length ratio.

Figure 3C:
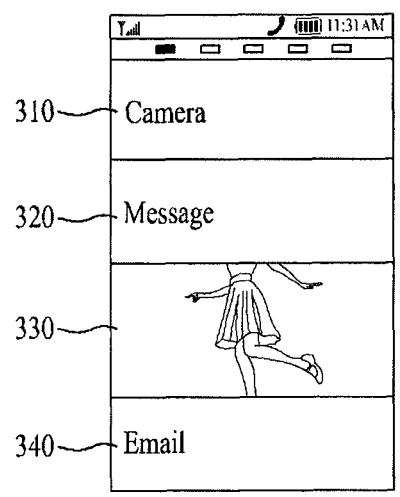

In the menu screen shown in FIG. 3C, menu items are included as small as the minimum number of menu items (i.e., the image region 360 is included as one of the menu items) per line are included.

For instance, the minimum number of menu items, which can be included in a line, can be one. Hence, in the menu screen shown in FIG. 3C, minimum four menu items, and more specifically, three menu items and one image region can be included.

Of course, the minimum number of inclusive menu items can be at least one or can be set different per line.

In this case, a per-line vertical length ratio is set as a default, is automatically set by the terminal, or can be set according to a user selection. Moreover, a horizontal length of a menu item included in each line can be a maximum horizontal length of the corresponding line.

In case that a menu item amounting to the minimum inclusive number (e.g., 1) is included in a specific line (e.g., in FIG. 3C, all of the first to fourth lines 310 to 340 are included), it is unable to further shift a menu item included in the specific line to another line. This is because the minimum inclusive number of menu items should be included in the corresponding line at least. In this case, a menu item is brought from a menu screen of another page and is then arranged in the specific line. A prescribed one of the menu items included in the specific line is shifted to another line and is then arranged thereon.

Moreover, even if a per-line vertical length ration is specified, each of the entire or partial menu items included in a specific line (e.g., entire lines, partial lines, etc.) can have a predetermined vertical length irrespective of the specified vertical length ratio.

FIGS. 4A to 4E are diagrams of a menu screen corresponding to each of a plurality of pages included in the menu screen according to the present invention.

Figure 4A:
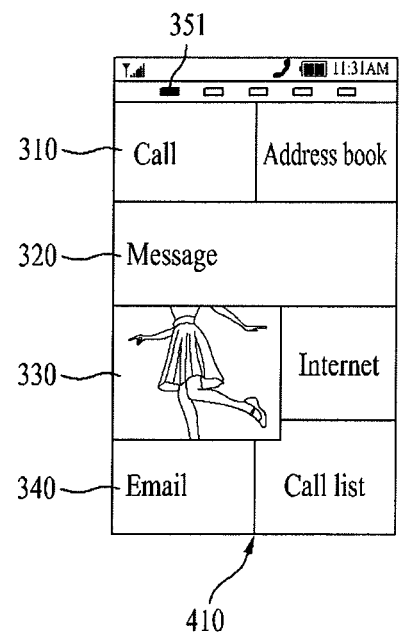
FIGS. 4A to 4E are diagrams of a menu screen corresponding to each of a plurality of pages included in the menu screen according to the present invention.
Figure 4B:
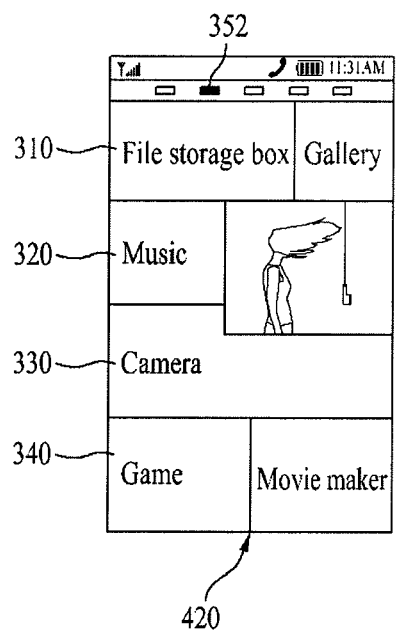
Figure 4C:
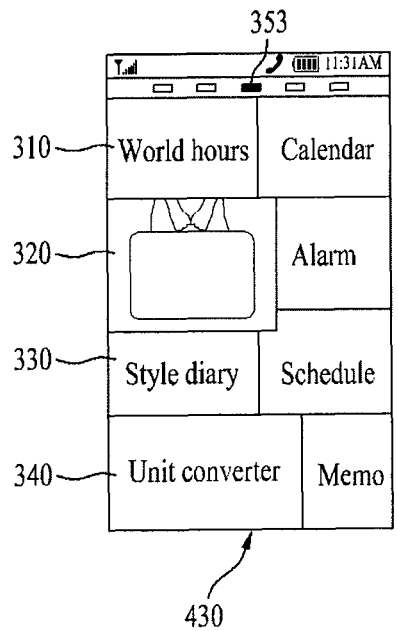
Figure 4D:
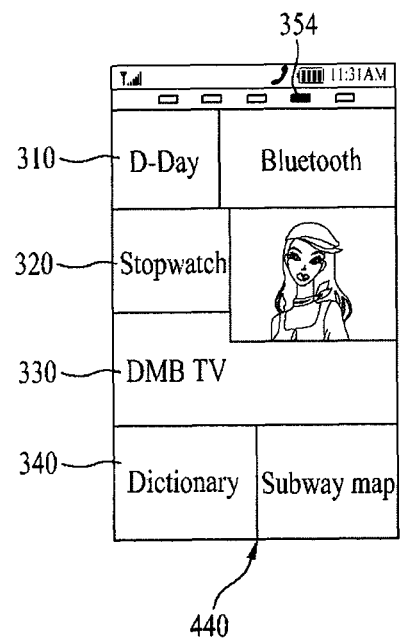
Figure 4E:
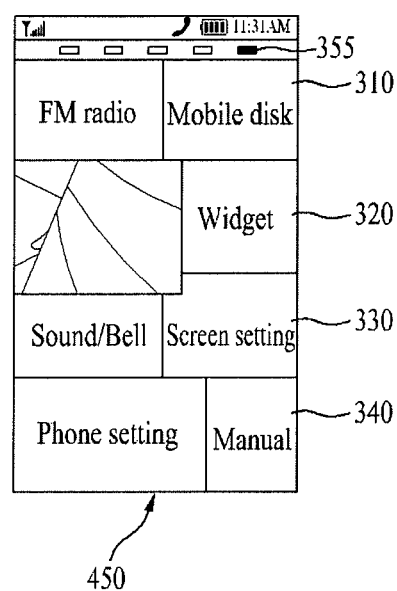

In particular, FIG. 4A shows a first menu screen 410 of a first page, FIG. 4B shows a second menu screen 420 of a second page, FIG. 4C shows a third menu screen 430 of a third page, FIG. 4D shows a fourth menu screen 440 of a fourth page, and FIG. 4E shows a fifth menu screen 450 of a fifth page.

And, indicators 351 to 355 shown in FIGS. 4A to 4E can be distinguishably displayed to indicate currently displayed menu screens (or pages corresponding to the menu screens), respectively.

For instance, referring to FIG. 4A, in order to indicate the currently displayed first menu item 410 or the first page corresponding to the first menu screen 410, a glow effect can be given to the first page indicator 351.

Inter-menu screen shift (or inter-page shift) shall be described in detail later.

Figure 5A:
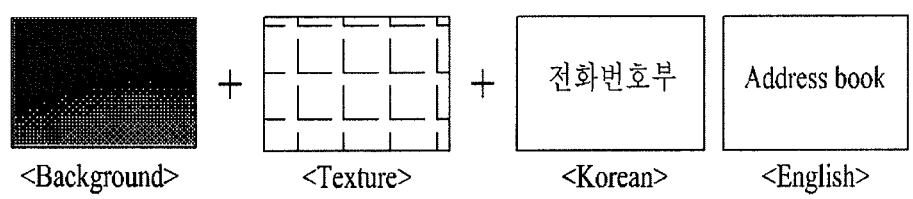
FIG. 5A and FIG. 5B are diagrams of configurations of a menu item according to the present invention.
Figure 5B:
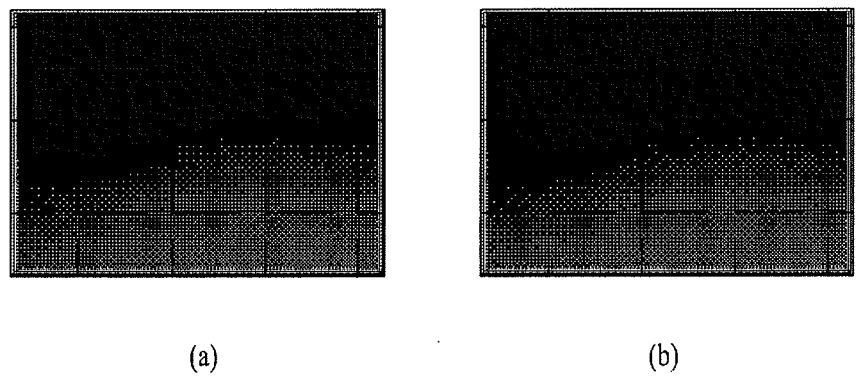

FIG. 5A and FIG. 5B are diagrams of configurations of a menu item according to the present invention. For clarity and convenience, the following description is made by limiting a menu item to an address book.

Referring to FIG. 5A, a menu item can be configured based on layers. For instance, the menu item can include a background layer, a texture layer and a text layer (e.g., Korean layer, English layer, etc.). These layers can be stored per menu item in the memory 160.

In particular, each of the background layer and the texture layer is manufactured in a maximum size and can be adjusted according to a position, size or ratio of the menu item included in a menu screen. The text layer is manufactured in various sizes and can have a size suitable for a position, size or ratio of the menu item included in a menu screen. Moreover, the text layer is manufactured with various languages (e.g., Korean, English, etc.) and can be manufactured in various sizes amounting to the maximum number of menu items, which can be included in one line.

Referring to FIG. 5B, a text layer of a menu item can include a Korean layer (a) or an English layer (b).

Figure 6A:
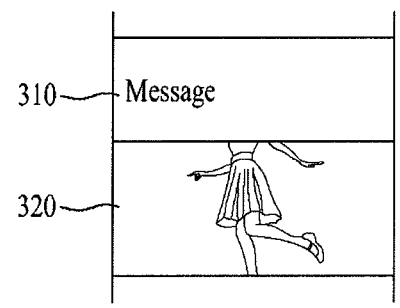
FIGS. 6A to 6C are diagram of screen configurations for displaying a plurality of menu items included in one line by a basic ratio according to the present invention.
Figure 6B:
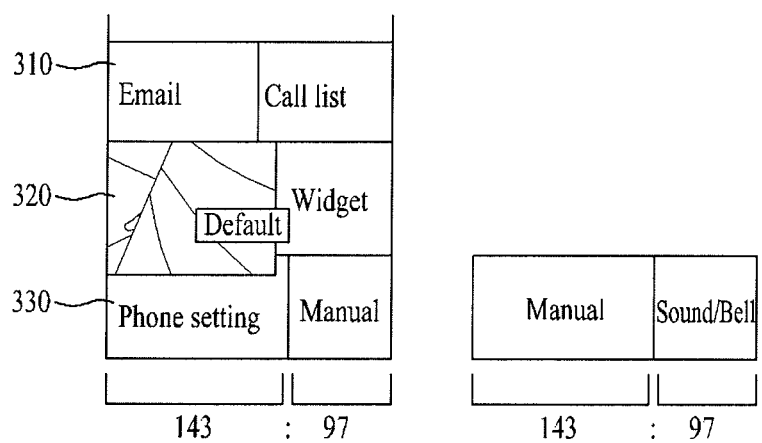
Figure 6B:
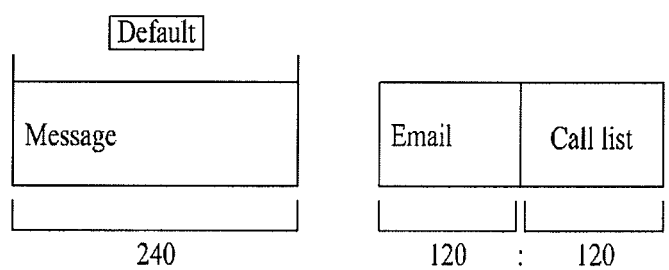
Figure 6C:
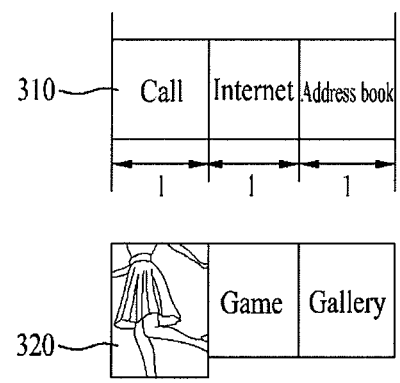

FIGS. 6A to 6C are diagram of screen configurations for displaying a plurality of menu items included in one line by a basic ratio according to the present invention.

Referring to FIG. 6A, a menu item 'message' and an image region can be included in a first line 310 and a second line 320, respectively. In case that one menu item or one image region is included in one line, it may be impossible to shift the included menu item or image region to another line. And, the included menu item or image region can be displayed on a while display region of the corresponding line.

Referring to FIG. 6B (a), when two menu items are included in a specific line, if a default horizontal length ratio (e.g., 142:97) for the two menu items are set, the two menu items included in the specific line can be displayed according to the default horizontal length ratio. In this case, the default horizontal length ratio is set in the terminal in advance or can be set by a selection made by a user.

For instance, one menu item located left is displayed by 143, while the other menu item located right is displayed by 97. Alternatively, an originally located menu item is displayed by 143, while a shifted and arranged menu item is displayed by 97. Alternatively, a menu item to display by 143 and a menu item to display by 97 can be respectively specified.

Meanwhile, FIG. 6B (a) is applicable to a case that the number of default menu items, which can be included in a specific line, is specified to 2.

Referring to FIG. 6B (b), when two menu items are included in a specific line, if a default horizontal length ratio for the two menu items is not set, the two menu items included in the specific line can be displayed by the ratio of 1:1.

Meanwhile, FIG. 6B (a) is also applicable to a case that the number of default menu items, which can be included in a specific line, is specified to the number except 2.

Figure 7A:
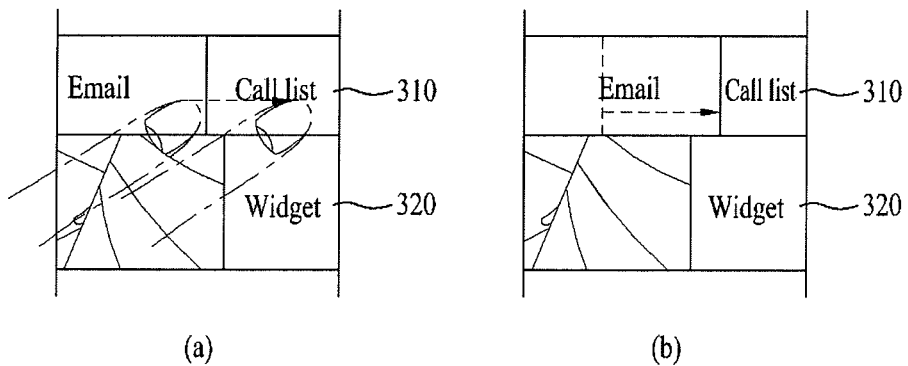
FIG. 7A and FIG. 7B are diagrams of screen configurations for displaying a plurality of menu items included in one line or a plurality of lines by a user setting ratio according to the present invention.
Figure 7B:
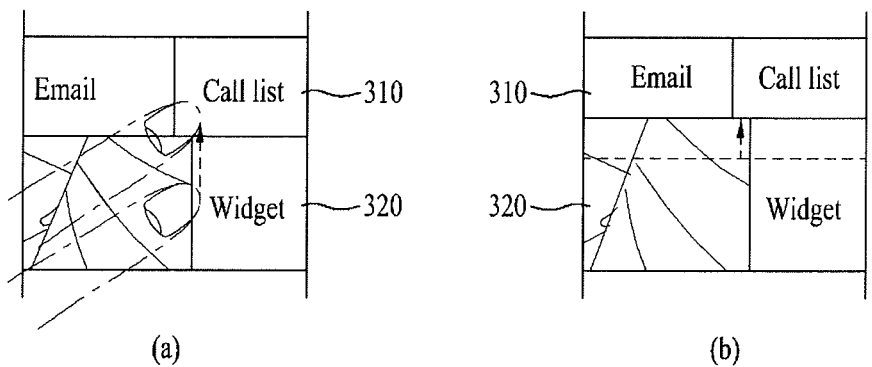

FIG. 7A and FIG. 7B are diagrams of screen configurations for displaying a plurality of menu items included in one line or a plurality of lines by a user setting ratio according to the present invention.

Referring to FIG. 7A, when a menu item 'email' and a menu item 'call list' are included in a first line 310, if an input of a touch and drag action (in a right direction) from one point of the email to the call list is received (a), the mobile terminal 100 is able to enlarge a horizontal length of the email to correspond to the touch and drag distance. In this case, a horizontal length of the call list can be reduced to correspond to the enlargement of the horizontal length of the email.

Of course, in case of receiving an input of a touch and drag action from one point of the email to a left direction, the horizontal length of the email is reduced to correspond to the touch and drag distance but the horizontal length of the call list can be enlarged to correspond to the touch and drag distance.

Referring to FIG. 7B, if an input of a touch and drag action (in a top direction) from one point of a second line 320 to one point of a first line 310(a), the mobile terminal 100 is able to enlarge a vertical length of the second line 320 to correspond to the touch and drag distance. In this case, a vertical length of the first line 310 can be reduced to correspond to the enlargement of the vertical length of the second line 320.

Of course, in case of receiving an input of a touch and drag action from one point of the second line 320 to a bottom direction, the vertical length of the second line 320 is reduced to correspond to the touch and drag distance but the vertical length of the first line 310 can be enlarged to correspond to the touch and drag distance.

FIGS. 8A to 8D are diagrams of screen configurations for setting a display configuration of a menu screen according to the present invention.

Figure 8A:
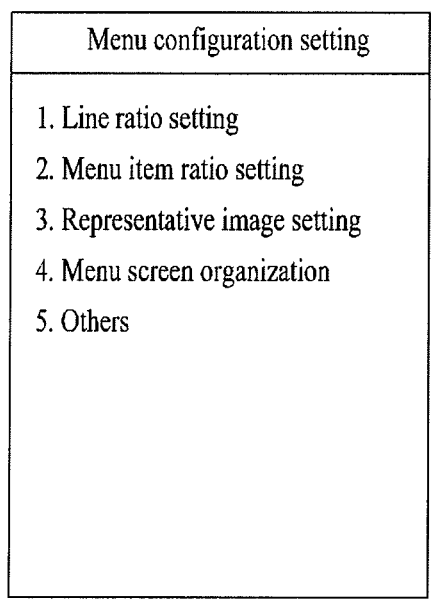
FIGS. 8A to 8D are diagrams of screen configurations for setting a display configuration of a menu screen according to the present invention.

Referring to FIG. 8A, the mobile terminal 100 is able to display a list including actions for setting a display configuration of a menu screen via a menu search. In this following description, assume that the maximum number of lines, which can be included in one menu screen, is 4. And, assume that the maximum number of menu items, which can be included in one line, is 3.

Figure 8B:
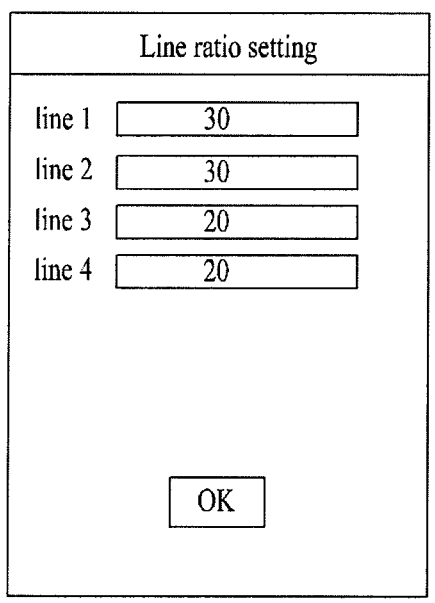

Referring to FIG. 8B, in case that a line ratio setting is selected from the list shown in FIG. 8A, the mobile terminal 100 is able to set a vertical length ratio of first to fourth lines according to a user selection. For instance, assuming that a total vertical length is 100, the first to fourth lines can be set to 30, 30, 20 and 20, respectively.

FIG. 8B is a diagram for a basic setup of a per-line vertical length ratio. And, a vertical length of a specific menu item or image region included in a specific line can be separately set in addition to the basic setup of the vertical length ratio.

Figure 8C:
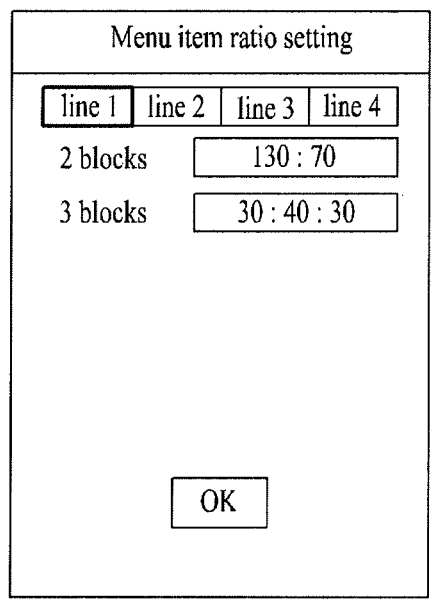

Referring to FIG. 8C, if a menu item ratio setting is selected from the list shown in FIG. 8A, the mobile terminal 100 is able to set a per-menu item vertical length ratio according to a user selection for a case that two or three menu items are included in each line.

For instance, for a first line, if two menu items exist, assuming that a total horizontal length is 200, the horizontal length ratio can be set to 130:70. If three menu items exist, assuming that a total horizontal length is 100, the horizontal length ratio can be set to 30:40:30.

Figure 8D:
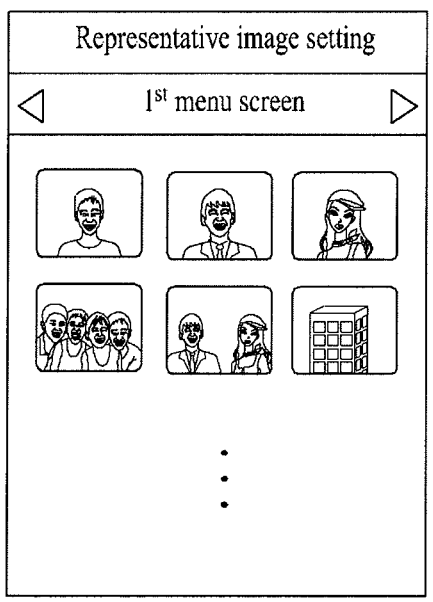

Referring to FIG. 8D, if a representative image setting is set from the list shown in FIG. 8A, the mobile terminal 100 is able to set an image, which will be displayed in an image region per menu screen, according to a user selection.

For instance, if a representative image setting is set from the list shown in FIG. 8A, the mobile terminal 100 displays a plurality of selectable images. A user is then able to select an image to display on an image region from a plurality of the displayed images. In case that a plurality of menu screens are included, a user selects an image, which will be displayed on an image region included in each of a plurality of the menu screen, from a plurality of the displayed images or is able to select an image in common with a plurality of the menu screens from a plurality of the displayed images.

Moreover, a user is able to select a portion to display on an image region from the whole selected image. Alternatively, a user is able to a plurality of images to display on the image region.

Specifically, in case of displaying a plurality of images on one image region, the mobile terminal 100 sequentially display a plurality of the images with a predetermined time interval. Alternatively, the mobile terminal divides the image region into a plurality of sub-regions and is then able to display a plurality of the images on a plurality of the sub-regions, respectively.

According to the present invention, in case of receiving an input of a touch and drag action from a user, the mobile terminal 100 shifts a menu item located in a first line to another line except the first line and is then able to display the shifted menu item in the corresponding line.

In the following description, a method of organizing a menu screen according to the present invention is explained in detail with reference to the accompanying drawings.

Figure 9:
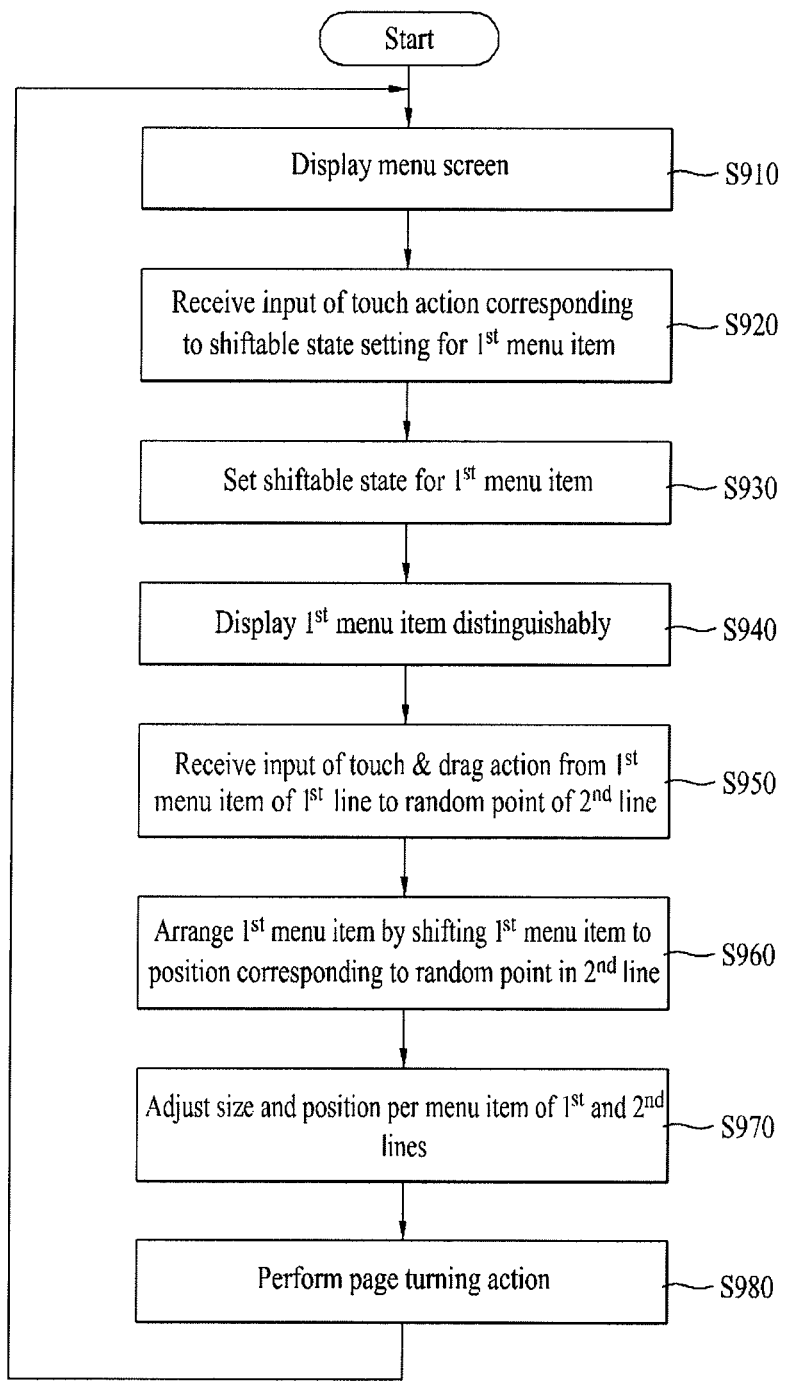
FIG. 9 is a flowchart of a method of organizing a menu screen in a mobile terminal according to one embodiment of the present invention.

FIG. 9 is a flowchart of a method of organizing a menu screen in a mobile terminal according to one embodiment of the present invention.

Referring to FIG. 9, the mobile terminal 100 displays a menu screen including a plurality of lines, in each of which at least one menu item is arranged, on the touchscreen 151 under the control of the controller 180 (S910).

The controller 180 is able to set at least one of the number of the menu items, which can be included in each of the lines, and the number of the lines, which can be included in the menu screen. In doing so, the controller 180 is able to set the number(s) randomly or according to a user selection made via the user input unit 130.

The controller 180 is able to set at least one of a horizontal length ratio of a plurality of menu items included in one line and a vertical length ratio of a plurality of lines which can be included in one menu screen (refer to FIGS. 8A to 8D). In doing so, the controller 180 is able to set the ratio(s) randomly or according to a user selection made via the user input unit 130.

Therefore, the mobile terminal 100 is able to display the menu screen according to the set menu item number, line number, per-menu item horizontal length ratio or per-line vertical length ratio.

And, a method of displaying the menu screen can refer to the former description.

The mobile terminal 100 receives an input of a touch action corresponding to a shiftable state setting for a first menu item (this means a random menu item arranged in a first line) arranged in the first line (this means a random one of a plurality of lines) among a plurality of the lines included in the displayed menu item (S920).

In this case, the touch action (hereinafter named a shift touch action) corresponding to the shiftable state setting can be discriminated from a touch action (hereinafter named an execution touch action) corresponding to an execution command for the first menu item. In this case, pattern information on the touch action corresponding to each of the shift touch action and the execution touch action can be stored in the memory 160 in advance.

For instance, the shift touch action can include the touch action performed longer than predetermined duration, whereas the execution touch action can include the touch action performed shorter than the predetermined duration. The shift touch action can include a multi-touch action, whereas the execution touch action can include a single touch action. The shift touch action can include multiple touch actions, whereas the execution touch can include a touch action performed once. And, each of the shift touch action and the execution touch action can include a touch action having a corresponding specific action.

In the inputting step S920, the mobile terminal 100 is able to receive an input of the shift touch action on each of a plurality of the menu items.

In case of receiving an input of the shift touch action on the first menu item in the inputting step S920, the mobile terminal 100 sets the shiftable state for the first menu item and then distinguishably display the first menu item, under the control of the controller 180 (S930).

In this case, the distinguishable display of the first menu item is performed to indicate that the shiftable state is set for the first menu item.

For instance, in order to distinguishably display the first menu item, the mobile terminal 100 raises the definition of the first menu item higher than those of other menu items, differentiates a color of the first menu item, thickens an outline of the first menu item, or displays the first menu item in a manner of vibrating the first menu item.

In the following description, the distinguishable display of the first menu item according to the shift touch action or the execution touch action is explained with reference to FIGS. 10A to 10C. For clarity and convenience, assume that the shift touch action includes the touch action performed longer than predetermined duration. And, assume that the execution touch action includes the touch action performed shorter than the predetermined duration. Moreover, assume that the first menu item includes 'Internet' 314.

Figure 10A:
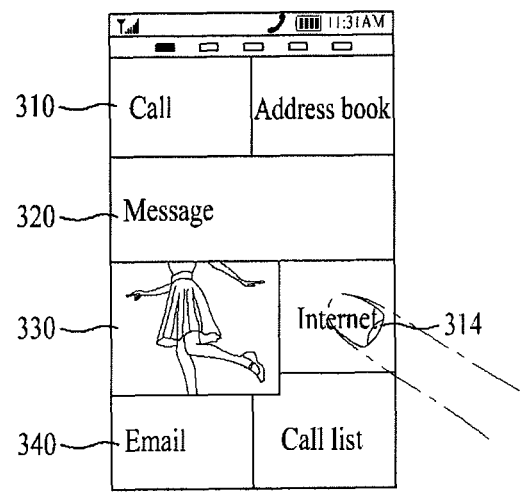
FIGS. 10A to 10C are diagrams of screen configurations for distinguishably displaying a menu item in a shiftable state according to the present invention.
Figure 10B:
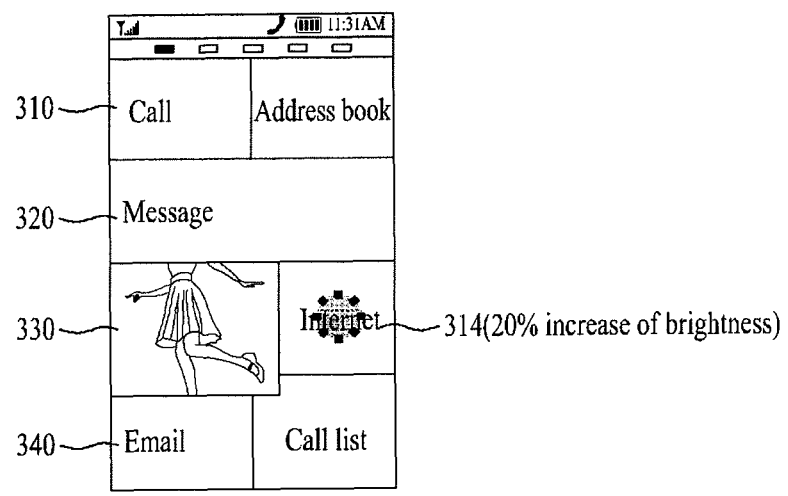
Figure 10C:
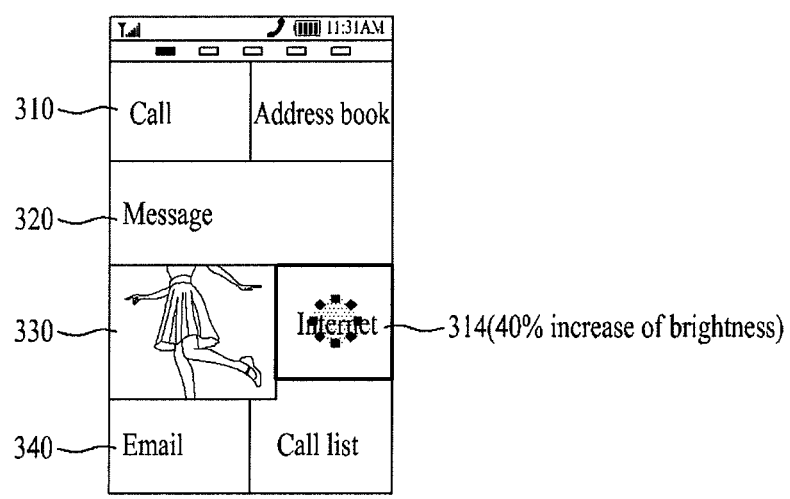

FIGS. 10A to 10C are diagrams of screen configurations for distinguishably displaying a menu item in a shiftable state according to the present invention;

Referring to FIG. 10A and FIG. 10B, in case of receiving an input of a touch action performed shorter than a predetermined duration on the Internet 314, the mobile terminal increases brightness of the Internet 314 by 20% and is able to execute a function or application related to the Internet 314. In doing so, the brightness of the Internet 314 can be gradually increased in proportion to the touch duration (maximum 20% increase).

Referring to FIG. 10A and FIG. 10C, in case of receiving an input of a touch action performed longer than a predetermined duration on the Internet 314, the mobile terminal increases brightness of the Internet 314 by 40% and is able to set a shiftable state for the Internet 314. In doing so, the brightness of the Internet 314 can be gradually increased in proportion to the touch duration (maximum 40% increase).

Meanwhile, the 20% of the brightness increase extent corresponding to the execution touch action and the 40% of the brightness increase extent corresponding to the shift touch action are exemplary and can be set to other values, respectively. In case that the brightness increase extents are set to other values, respectively, the brightness increase extent corresponding to the shift touch action can be set greater than the brightness increase extent corresponding to the execution touch action.

Besides, in case that the first menu item, for which the shift touch action was inputted, is in a non-shiftable state (e.g., a menu item, for which a shift touch action was inputted, is included in a corresponding line only or is an image region), the mobile terminal 100 is able to distinguishably display the first menu item to indicate the non-shiftable state (not shown in the drawing).

For instance, an outline of the first menu item is made to flicker plural times. Alternatively, the first menu item is displayed with maximum transparency or brightness and is then made to return to its original state. Alternatively, the first menu item is displayed in a manner of fading in for predetermined duration and then fading out for predetermined duration again.

Referring now to FIG. 9, the mobile terminal 100 receives an input of a touch and drag action from a first point belonging to the shiftable state set first menu item to a second point (e.g., a random point in a second line) of the second line (e.g., another line except the line to which the first menu item belongs) (S950).

In this inputting step S950, the touch and drag action from the first point to the second point is limitedly explained. Alternatively, a multi-touch to the first and second points or a sequential touch to the first and second points is applicable as good as the touch and drag action.

In case of receiving the input of the touch and drag action, the mobile terminal 100 is able to shift and display a copy of the first menu item to correspond to a path of the touch and drag action under the control of the controller 180.

In other words, after the copy of the first menu item has been displayed at a position corresponding to a point currently touched by the touch and drag action, as the touched point is shifted by the touch and drag action, the copy of the first menu item can be shifted together.

In case of receiving the input of the touch and drag action, the mobile terminal 100 is able to display an indicator indicating a position, at which the first menu item can be arranged in a plurality of the lines, in the course of the touch and drag action under the control of the controller 180.

For instance, if the first menu item is arrangeable between second and third menu items included in the second line, the indicator can be displayed between the second and third menu items.

In case of receiving the input of the touch and drag action in the inputting step S950, the mobile terminal 100 arranges the first menu item in a manner of shifting the first menu item to a position corresponding to the second point in the second line under the control of the controller 180 (S960).

In particular, if the touch and drag action is released from the second point, if the touch of the touch and drag action is maintained at the second point over predetermined duration, or if the second point or the first menu item is retouched after the release of the touch and drag action, the mobile terminal 100 is able to arrange the first menu item by shifting the first menu item to the position corresponding to the second point.

After the first menu item in the first line has been completely shifted to the second line (S960), the mobile terminal 100 adjusts a size and position per menu item for each of the first and second lines under the control of the controller 180 (S970).

In other words, the controller 180 deletes the first menu item from the first line and then adds the first menu item to the second line.

For instance, assume that 3 menu items and 2 menu items are included in the first line and the second line before the shift of the first menu item, respectively. As the number of the menu items in the first line is decremented to 2 from 3, sizes and positions of the remaining 2 menu items can be adjusted according to the horizontal length ratio for the case of 2 menu items. As the number of the menu items in the second line is incremented to 3 from 2, sizes and positions of the 3 menu items including the first menu item can be adjusted according to the horizontal length ratio for the case of 3 menu items.

In the following description, the shifted arrangement of the first menu item is explained in detail with reference to the accompanying drawings.

Figure 11A:
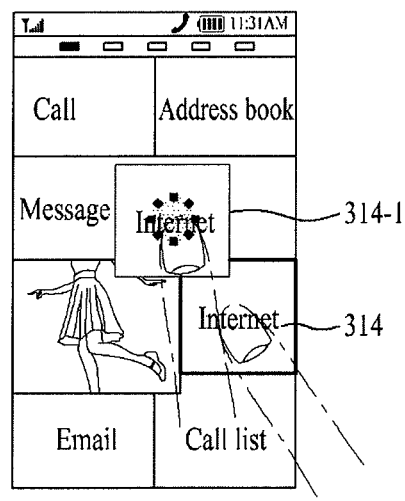
FIGS. 11A to 11C are diagrams of screen configurations for releasing a shiftable state for a specific menu item according to the present invention.
Figure 11B:
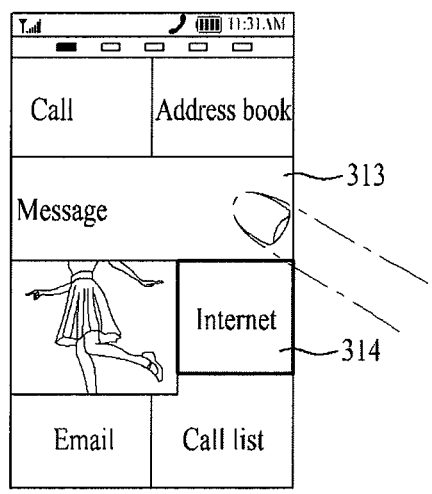
Figure 11C:
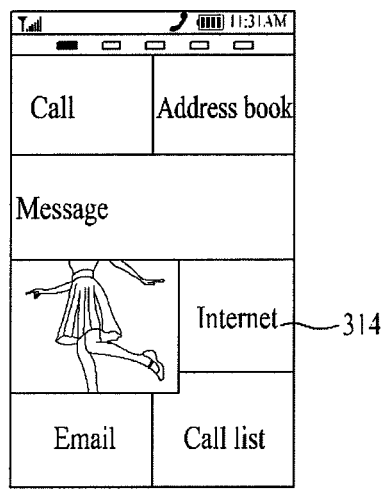

FIGS. 11A to 11C are diagrams of screen configurations for releasing a shiftable state for a specific menu item according to the present invention.

Referring to FIG. 11A, in the course of a touch and drag action on a first menu item 314 for which a shiftable state is set, the mobile terminal 100 is able to shift and display a copy 314-1 of the first menu item 314.

Referring to FIG. 11B, if the touch and drag action in FIG. 11A is released before the shifted arrangement of the first menu item 314, the mobile terminal 100 stops displaying the copy 314-1 of the first menu item 314 and is then able to maintain the shiftable state of the first menu item 314.

Referring to FIG. 11C, in case that another menu item is touched in the shiftable state of the first menu item 314 in FIG. 11B, the mobile terminal 100 releases the shiftable state of the first menu item 314 and is then able to return to a normal menu screen display state.

Moreover, if the touch to another menu item includes a shift touch action, it is able to set a shiftable state for another menu item. If the touch to another menu item includes an execution touch action, it is able to execute a function or application corresponding to another menu item.

Of course, irrespective of whether the touch to another menu item is the shift touch action or the execution touch action, if the touch to another menu item exists, the mobile terminal 100 is always able to return to the normal menu screen display state.

FIGS. 12A to 15B are diagrams of screen configurations for shifting and arranging a first menu item in a shiftable state according to the present invention.

For clarity and convenience, assume that a shiftable state is set for a first menu item. And, assume that the first menu item includes 'Internet' 314 included in the third line 330.

Figure 12A:
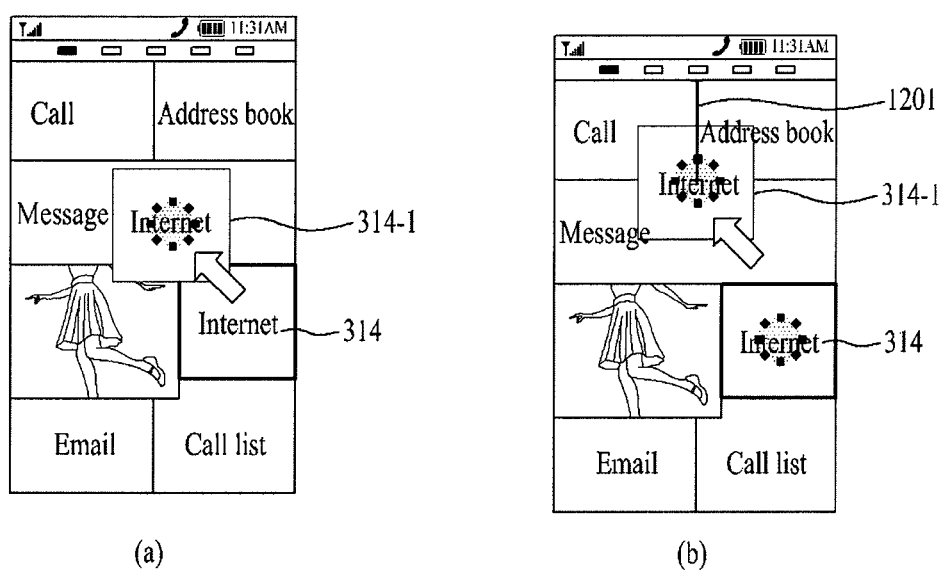
FIGS. 12A to 15B are diagrams of screen configurations for shifting and arranging a menu item in a shiftable state according to the present invention.
Figure 12B:
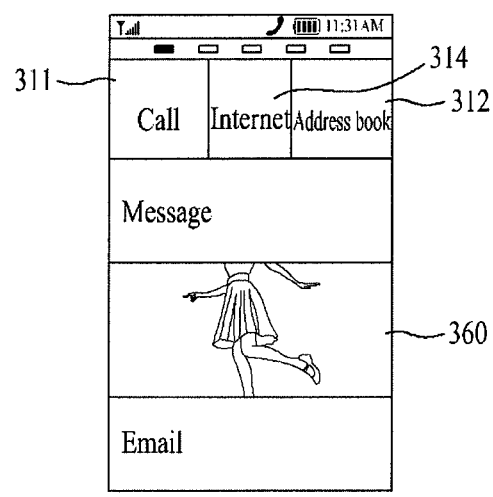

First of all, the following description is made with reference to FIG. 12A and FIG. 12B.

Referring to FIG. 12A, in case of receiving an input of a touch and drag action on one point within the Internet 314, the mobile terminal 100 is able to shift and display a copy 314-1 of the Internet 314 at a position corresponding to a touch and drag path.

For instance, the copy 314-1 of the Internet 314 can include the same content of the Internet 314, may have brightness different from that of the Internet 314, and can be transparently displayed with predetermined transparency (e.g., 50%). As the copy 314-1 of the Internet 314 is transparently displayed, a user can see the menu items located in a manner of being overlapped with the transparently displayed copy 314-1.

In particular, referring to FIG. 12A (b), the mobile terminal 100 is able to display an indicator 1201 indicating a point, at which the Internet 314 is arrangeable by being shifted, in the course of the touch and drag action.

In this case, the indicator 1201 is displayed on a prescribed vertical boundary line between menu items included in a specific line in which the Internet 314 can be shifted and arranged or can be displayed on a left vertical boundary line of a menu item located at the head of the menu items included in the specific line or a right vertical boundary line of a menu item at the tail of the menu items included in the specific line.

Moreover, the indicator 1201 can change its position according to a position of the copy of the Internet 314.

For instance, in case that an area of the copy 314-1 of the Internet 314 is included in a specific line over a predetermined reference, the indicator 1201 can be displayed on a vertical boundary line included in the specific line. For another instance, in case that the copy 314-1 of the Internet 314 is located by being overlapped with a specific vertical boundary line in a specific line, the indicator 1201 can be displayed on the specific vertical boundary line.

Referring to FIG. 12B, while the indicator 1201 is located on the vertical boundary line between the call 311 and the address book 312 included in the first line 310, if the touch and drag action is released, the mobile terminal 100 is able to arrange the Internet 314 between the call 311 and the address book 312.

Therefore, as the Internet 314 is shifted, the image region 360 is displayed on the whole third line 330. As the Internet 314 is shifted to the first line 310, the call 311, the Internet 314 and the address book 312 can be sequentially displayed on the first line 310.

In doing so, the three menu items arranged in the first line 310 can be displayed within the first line 310 according to a default horizontal length ratio or a horizontal length ratio selected by a user.

Figure 13A:
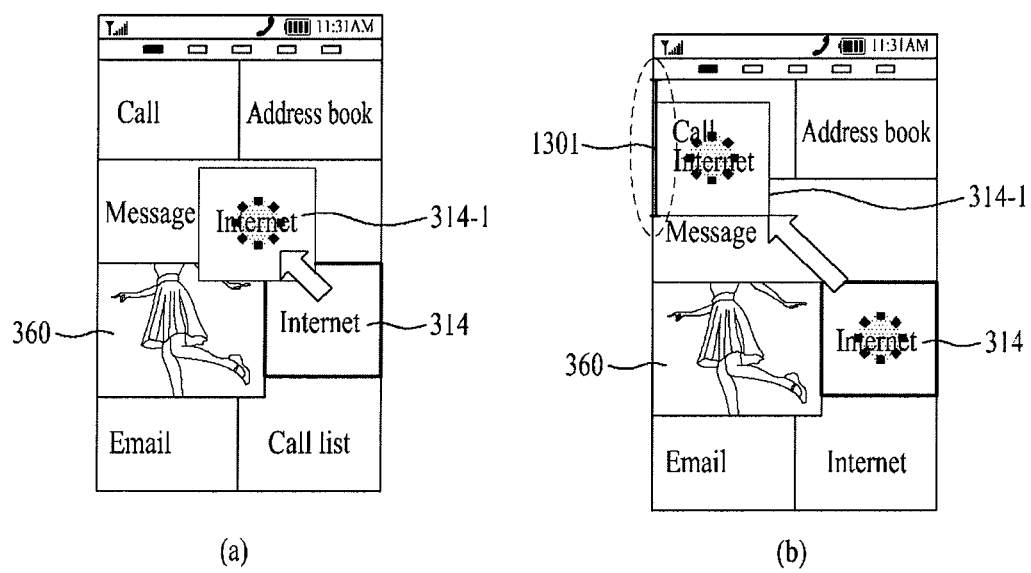
Figure 13B:
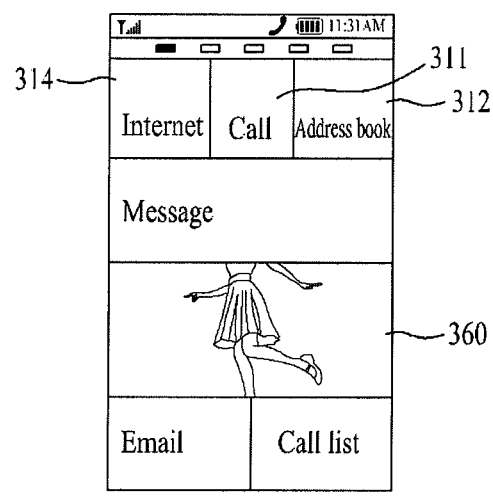

The following description is made with reference to FIG. 13A and FIG. 13B.

Referring to FIG. 13A, in case of receiving an input of a touch and drag action on one point within the Internet 314, the mobile terminal 100 is able to shift and display a copy 314-1 of the Internet 314 at a position corresponding to a touch and drag path.

In particular, referring to FIG. 13A (b), the mobile terminal 100 is able to display an indicator 1301 indicating a point, at which the Internet 314 is arrangeable by being shifted, in the course of the touch and drag action.

Details of the indicator 1301 will refer to the former description with reference to FIG. 12A and FIG. 12B.

Referring to FIG. 13B, while the indicator 1201 is located on the left vertical boundary line of the call 311 located at the head of the first line 310, if the touch and drag action is released, the mobile terminal 100 is able to arrange the Internet 314 in front of the call 311.

Therefore, as the Internet 314 is shifted, the image region 360 is displayed on the whole third line 330. As the Internet 314 is shifted to the first line 310, the Internet 314, the call 311 and the address book 312 can be sequentially displayed on the first line 310.

In doing so, the three menu items arranged in the first line 310 can be displayed within the first line 310 according to a default horizontal length ratio or a horizontal length ratio selected by a user.

Figure 14A:
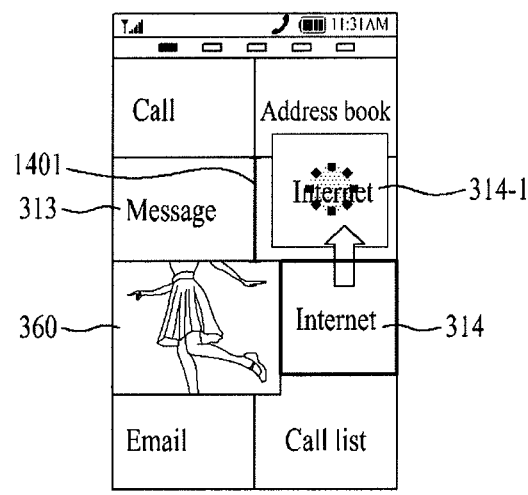
Figure 14B:
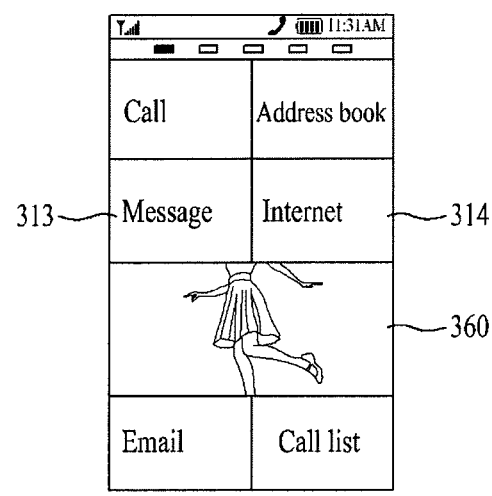

The following description is made with reference to FIG. 14A and FIG. 14B.

Referring to FIG. 14A, in case of receiving an input of a touch and drag action on one point within the Internet 314, the mobile terminal 100 is able to shift and display a copy 314-1 of the Internet 314 at a position corresponding to a touch and drag path.

In particular, referring to FIG. 14A (b), the mobile terminal 100 is able to display an indicator 1401 indicating a point, at which the Internet 314 is arrangeable by being shifted, in the course of the touch and drag action.

In doing so, if the indicator 1401 is displayed on a line having one menu item (or an image region) included therein, it can be displayed on a vertical boundary line randomly generated within the menu item.

Details of the indicator 1401 will refer to the former description with reference to FIG. 12A and FIG. 12B.

Referring to FIG. 14B, while the indicator 1201 is located on the random vertical boundary line within the message 313 included in the second line 320, if the touch and drag action is released, the mobile terminal 100 is able to arrange the Internet 314 behind the message 313.

In particular, after the message 313 has been divided into two equal parts, if the indicator 1401 is located at the left equal part, the Internet 314 is arranged in front of the message 313. If the indicator 1401 is located at the right equal part, the Internet 314 can be arranged in rear of the message 313.

Therefore, as the Internet 314 is shifted, the image region 360 is displayed on the whole third line 330. As the Internet 314 is shifted to the second line 320, the message 313 and Internet 314 can be sequentially displayed on the second line 320.

In doing so, the two menu items arranged in the second line 320 can be displayed within the second line 320 according to a default horizontal length ratio or a horizontal length ratio selected by a user.

Figure 15A:
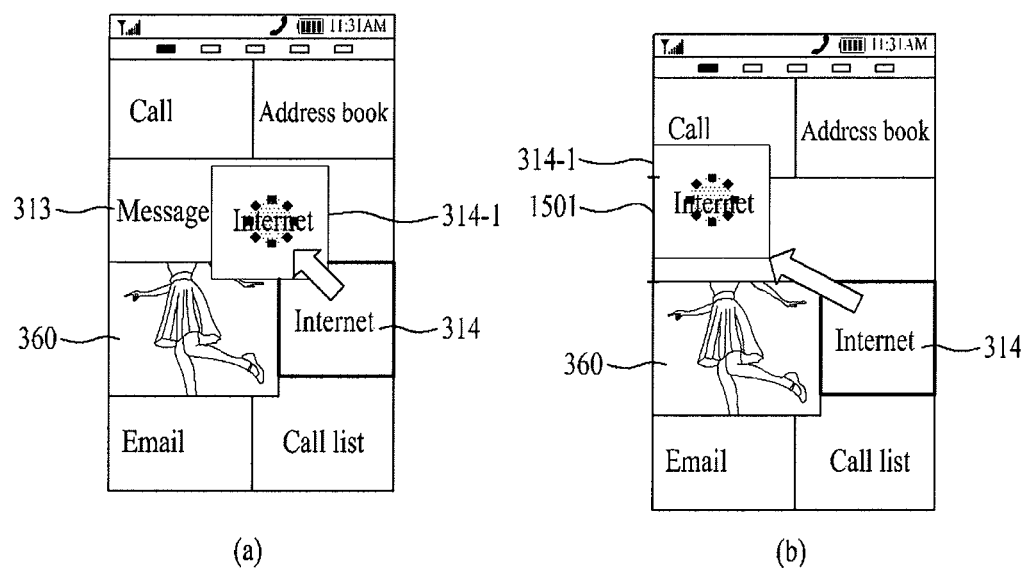
Figure 15B:
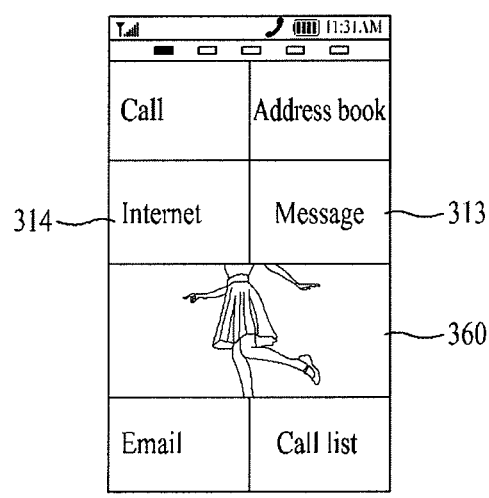

The following description is made with reference to FIG. 15A and FIG. 15B.

Referring to FIG. 15A, in case of receiving an input of a touch and drag action on one point within the Internet 314, the mobile terminal 100 is able to shift and display a copy 314-1 of the Internet 314 at a position corresponding to a touch and drag path.

In particular, referring to FIG. 15A (b), the mobile terminal 100 is able to display an indicator 1501 indicating a point, at which the Internet 314 is arrangeable by being shifted, in the course of the touch and drag action.

In doing so, if the indicator 1501 is displayed on a line having one menu item (or an image region) included therein, it can be displayed on a left or right vertical boundary line of the menu item.

Details of the indicator 1501 will refer to the former description with reference to FIG. 12A and FIG. 12B.

Referring to FIG. 15B, while the indicator 1501 is located on the left vertical boundary line of the message 313 included in the second line 320, if the touch and drag action is released, the mobile terminal 100 is able to arrange the Internet 314 in front of the message 313.

Moreover, while the indicator 1501 is located on the right vertical boundary line of the message 313, if the touch and drag action is released, the Internet 314 can be arranged in rear of the message 313.

Therefore, as the Internet 314 is shifted, the image region 360 is displayed on the whole third line 330. As the Internet 314 is shifted to the second line 320, the Internet 314 and the message 313 can be sequentially displayed on the second line 320.

In doing so, the two menu items arranged in the second line 320 can be displayed within the second line 320 according to a default horizontal length ratio or a horizontal length ratio selected by a user.

Figure 16A:
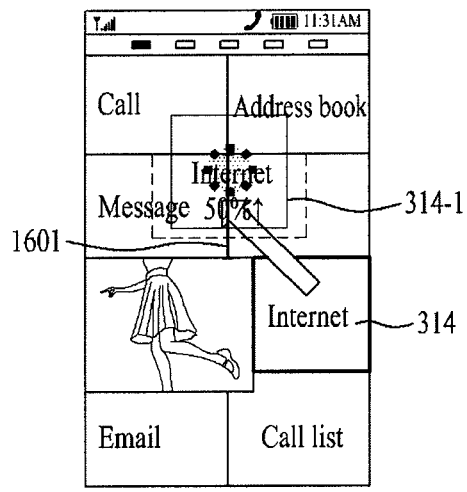
FIG. 16A and FIG. 16B are diagrams of screen configurations for indicating an arrangeable point in accordance with a position of a menu item copy, which is being shifted by a touch and drag action, according to the present invention.
Figure 16B:
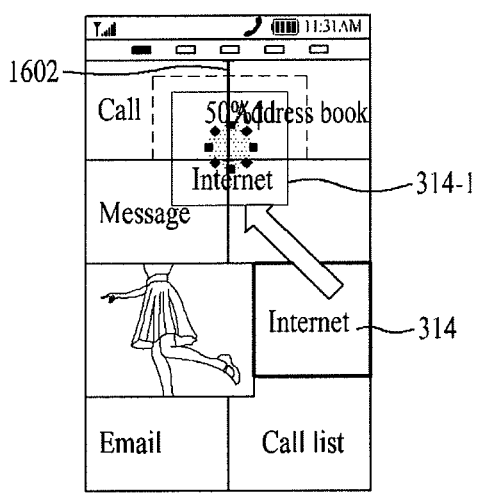

FIG. 16A and FIG. 16B are diagrams of screen configurations for indicating an arrangeable point in accordance with a position of a menu item copy, which is being shifted by a touch and drag action, according to the present invention. For clarity and convenience, assume that a shiftable state is set for the Internet 314.

Referring to FIG. 16A, if an area of the copy 314-1 of the Internet 314 is included in the second line 320 over a predetermined reference (e.g., 50%) to correspond to a touch and drag action path, the mobile terminal 100 is able to display an indicator 1601 within the second line 320.

Referring to FIG. 16B, if an area of the copy 314-1 of the Internet 314 is included in the first line 310 over a predetermined reference (e.g., 50%) to correspond to a touch and drag action path, the mobile terminal 100 is able to display an indicator 1601 within the first line 310.

This indicates that the Internet 314 is arrangeable in the line, in which the area of the copy 314-1 of the Internet 314 is included over the predetermined reference, by being shifted thereto.

Moreover, in case that there are a plurality of points, at which a menu item copy is arrangeable, in one line, indicators can be displayed at a plurality of the points, respectively. Alternatively, the indicator can be displayed at the point included in the menu item copy in part or entirely among a plurality of the points, the point closest to the menu item copy among a plurality of the points or the point selected by the user from a plurality of the points.

Referring now to FIG. 9, in case that a plurality of the menu screens include a plurality of the pages, the mobile terminal 100 is able to display menu screens included in different pages by performing a page turning action (S980). Optionally, the menu screens on the different pages can be configured to differ from each other.

In the displaying step S980, the mobile terminal 100 displays a page indicator corresponding to each of a plurality of the pages (or menu screens) on a prescribed region of the screen and is able to distinguishably display the page indicator corresponding to the currently displayed page or menu screen (cf. FIGS. 4A to 4E).

For instance, in performing the page turning action from the first page to the third page, in case of receiving an input of a selection of the page indicator corresponding to the third page from a user or an input of a touch action for commanding the page turning to the third page from a user, the mobile terminal 100 is able to perform the page turning action to the third page.

Besides, the page turning action can be performed in the shiftable state of the first menu item as well (cf. S930).

For instance, if the first page is shifted to the third page by the page turning action, the mobile terminal 100 displays the menu screen corresponding to the third page and is also able to display a copy of the first menu item together. Therefore, the first menu item can be arranged in a prescribed line included in the menu screen corresponding to the third page.

In the following description, a screen configuration for performing a page turning action with the existence of a menu item in a shiftable state is explained with reference to the accompanying drawings. FIGS. 17A to 18C are diagrams of screen configurations for performing a page turning action at the presence of a menu item in a shiftable state according to the present invention.

For clarity and convenience, assume that the Internet 314 is in the shiftable state. Of course, embodiments relating to the following page turning action are applicable to a normal menu screen display state (i.e., a menu item in a shiftable state does not exist) as well.

Figure 17A:
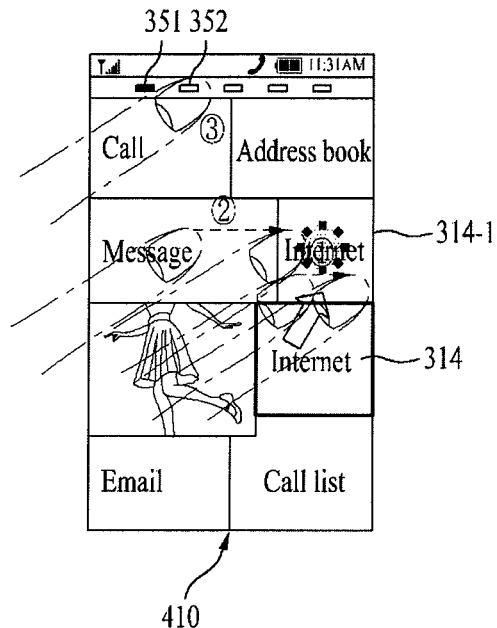
FIGS. 17A to 18C are diagrams of screen configurations for performing a page turning action at the presence of a menu item in a shiftable state according to the present invention.
Figure 17B:
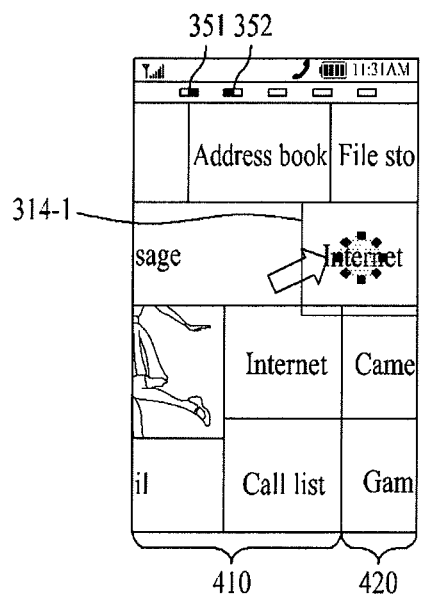

First of all, the following description is made with reference to FIG. 17A and FIG. 17B.

Referring to FIG. 17A, the mobile terminal 100 is able to receive a command for a page turning from a user in various ways.

For instance, while a touch by a touch and drag action from the Internet 314 is maintained, in case of receiving a touch and drag action or a flicking action corresponding to the page turning (1), the mobile terminal 100 is able to receive a command for the page turning.

In this case, the touch and drag action corresponding to the page turning is able to command a page turning action in order of an increasing page number if a direction of a touch and drag action is right. If a direction of a touch and drag action is left, the touch and drag action corresponding to the page turning is able to command a page turning action in order of a decreasing page number.

Moreover, the touch and drag action corresponding to the page turning can increment the number of pages turned in proportion to a touch and drag action distance. In particular, the greater the touch and drag action distance becomes, the higher the number of the turned pages gets.

The flicking action corresponding to the page turning can increment the number of pages turned in proportion to a flicking count or speed. In particular, the higher the flicking count or speed becomes, the higher the number of the turned pages gets.

For instance, in case of receiving an input of a touch and drag action or a flicking action corresponding to the page turning in a shiftable state of the Internet 314 (2), the mobile terminal 100 is able to receive a command for the page turning. Of course, this is applicable in a normal menu screen display state as well as the shiftable state of the Internet 314.

In this case, it is not necessary to perform the touch and drag action on the Internet 314. An inputted point of the touch and drag action nor the flicking action is non-limited unless it is within a menu screen.

Meanwhile, as mentioned in the foregoing description, the page turned direction or the number of the turned pages can vary according to the touch and drag direction/distance or the count/speed of the flicking action.

For instance, in case of receiving an input of a selection of the page indicator 352 corresponding to a specific page among first to fifth pages in a shiftable state of the Internet 314 (3), the mobile terminal 100 is able to receive an input of a command for turning to the page corresponding to the selected page indicator 352. Of course, this is applicable in a normal menu screen display state as well as the shiftable state of the Internet 314.

Referring to FIG. 17B, in case of receiving a command for the page turning to the second page in FIG. 17A, the mobile terminal 100 is able to display a sequential turning process from the first menu screen 410 corresponding to the first page to the second menu screen 420 corresponding to the second page.

In particular, instead of switching the screen from the first menu screen 410 to the second menu screen 420 directly, the second menu item 420 can be gradually displayed while the first menu screen 410 is gradually pushed away to the left.

To correspond to the sequential turning process from the first menu screen 410 to the second menu screen 420, a distinguishable display of the page indicator can be performed in a manner of moving to the second page indicator 352 from the first page indicator 351 gradually.

Figure 17C:
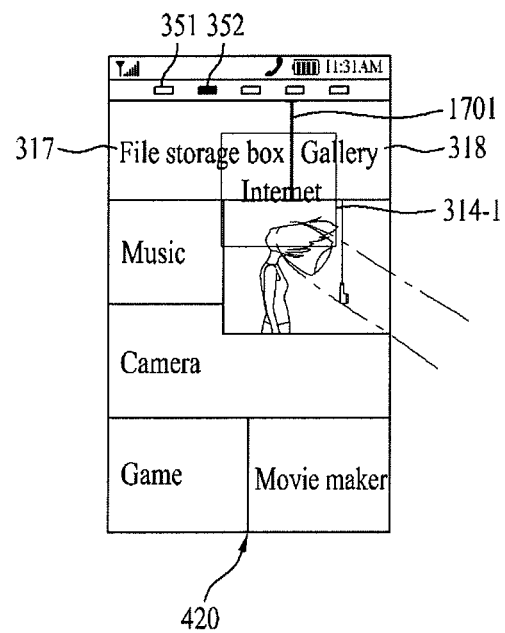

Referring to FIG. 17C, if the page turning to the second page including the second menu screen 420 is completed, the mobile terminal 100 is able to display the copy 314-1 of the Internet 314 in the shiftable state on a random point within the second menu screen 420.

In FIG. 17C, the mobile terminal 100 is able to receive an input of a touch and drag action from the copy 314-1 of the Internet 314 to a random point of a specific one of a plurality of lines included in the second menu screen 420 and is able to display an indicator 1701 on a point, at which the Internet 314 is arrangeable, to correspond to the inputted touch and drag action.

Figure 17D:
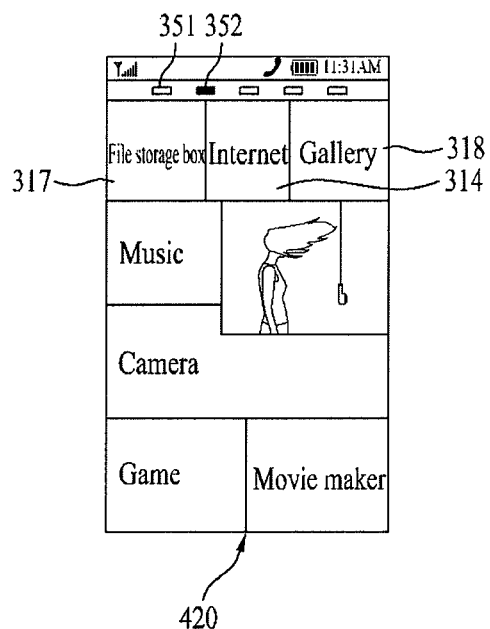

Referring to FIG. 17D, while an indicator 1701 is located on a vertical boundary line between a file storage box 317 and a gallery 318 in the first line 310 included in the second menu screen 420, if a touch and drag action is released, the mobile terminal 100 is able to arrange the Internet 314 between the file storage box 317 and the gallery 318.

Therefore, the file storage box 317, the Internet 314 and the gallery 318 can be sequentially displayed on the first line 310 of the second menu screen 420.

Figure 18A:
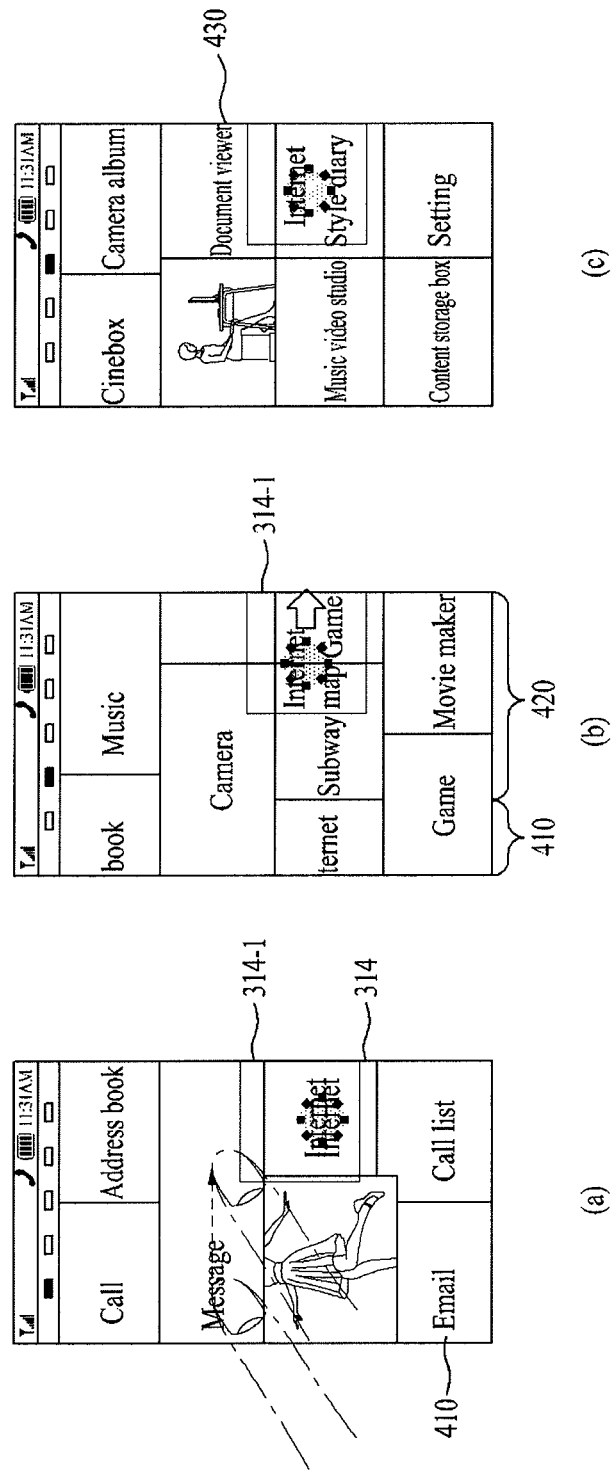
Figure 18B:
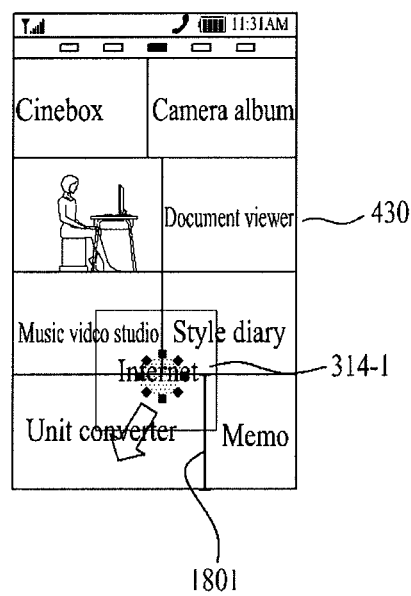
Figure 18C:
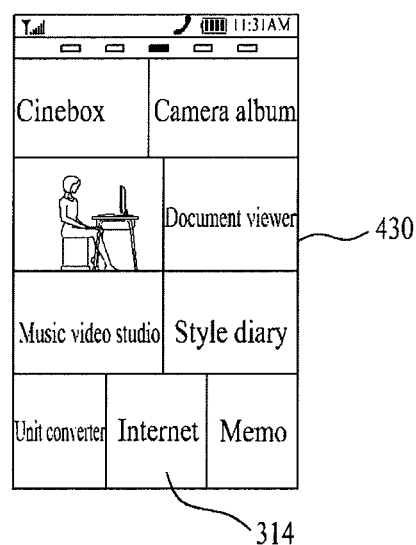

The following description is made with reference to FIGS. 18A to 18C.

Referring to FIG. 18A, in case of receiving an input of a touch and drag action or a flicking action corresponding to a page turning command from a user, the mobile terminal 100 is able to perform a page turning action from a first page a to a third page c via a second page b.

In particular, in case of receiving a command for the page turning from the first page to the third page, the mobile terminal 100 is able to display a sequential turning process from the first menu screen 410 corresponding to the first page to the third menu screen 430 corresponding to the third page.

So to speak, instead of switching the screen from the first menu screen 410 to the third menu screen 430 directly, the second menu item 420 is gradually displayed as the first menu screen 410 is gradually pushed away to the left. As the second menu screen 420 is gradually pushed away to the left, the third menu screen 430 can be gradually displayed.

To correspond to the sequential turning process from the first menu screen 410 to the third menu screen 430, a distinguishable display of the page indicator can be performed in a manner of moving to the third page indicator 353 from the first page indicator 351 via the second page indicator 352 gradually.

Referring to FIG. 18B, if the page turning to the third page including the third menu screen 430 is completed, the mobile terminal 100 is able to display the copy 314-1 of the Internet 314 in the shiftable state on a random point within the third menu screen 430.

Moreover, the mobile terminal 100 is able to receive an input of a touch and drag action from the copy 314-1 of the Internet 314 to a random point of a specific one of a plurality of lines included in the third menu screen 430 and is able to display an indicator 1801 on a point, at which the Internet 314 is arrangeable, to correspond to the inputted touch and drag action.

Referring to FIG. 18C, while the indicator 1801 is located on a vertical boundary line between a unit converter and a memo in the fourth line 340 included in the third menu screen 430, if the touch and drag action is released, the mobile terminal 100 is able to arrange the Internet 314 between the unit converter and the memo.

Therefore, the unit converter, the Internet 314 and the memo can be sequentially displayed on the fourth line 340 of the third menu screen 430.

Figure 19A:
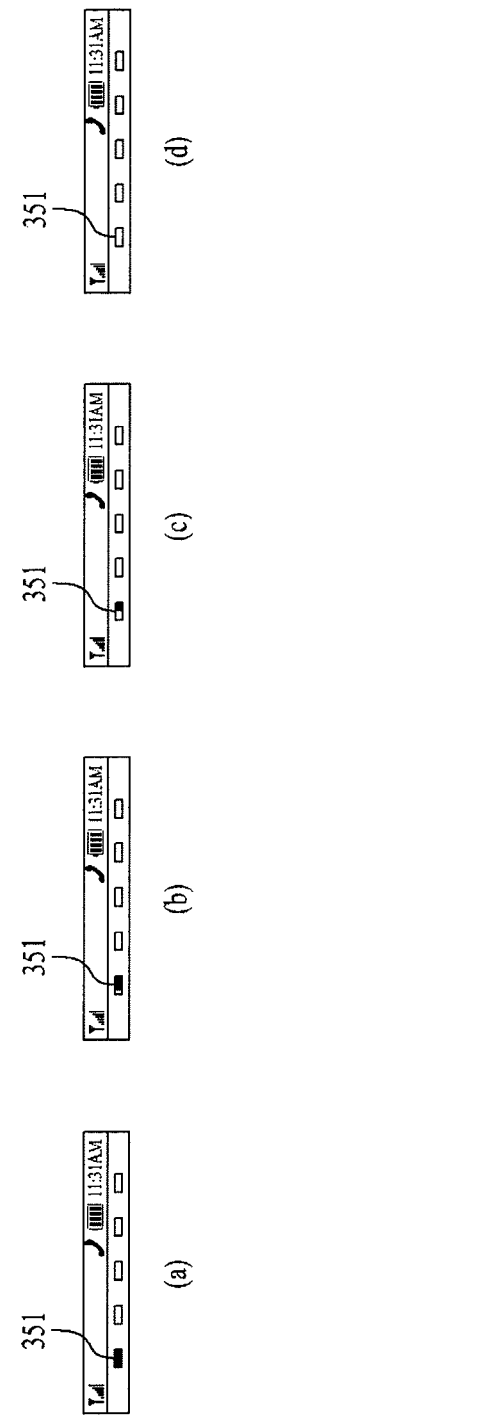
FIG. 19A and FIG. 19B are diagrams of screen configurations for displaying a page indicator in the course of performing a page turning action according to the present invention.
Figure 19B:
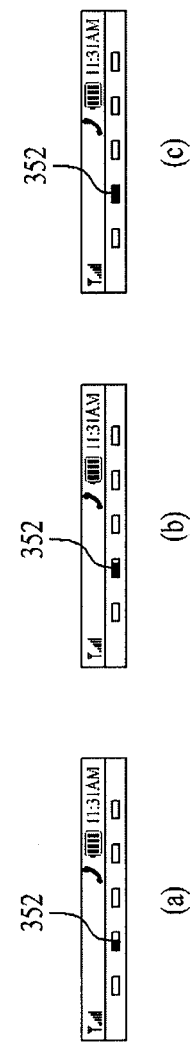

FIG. 19A and FIG. 19B are diagrams of screen configurations for displaying a page indicator in the course of performing a page turning action according to the present invention.

For clarity and convenience, assume a case that a first page is sequentially turned into a second page (cf. FIGS. 17A to 17C). A page indicator of a currently displayed page is displayed as an outer glow. And, the rest of page indicators can be displayed as gray color.

Referring to FIG. 19A, in case that a page turning is performed sequentially from a first page to a second page, a first page indicator 351 can be distinguishably displayed by a ratio corresponding to a turned extent of the first page as well.

For instance, if the turned extent of the first page increases, the outer glow display of the first page indicator 351 can be set to gradually decrease from the left. This brings an effect that the outer glow display is gradually shifted to correspond to the page shift using an outline of the first page indicator 351 as a frame or mask.

Referring to FIG. 19B, in case that pages are sequentially turned from the first page to the second page, a second page indicator 352 can be distinguishably displayed by a ratio corresponding to the turned extent of turning to the second page.

For instance, if the turned extent of the second page increases, the outer glow display of the second page indicator 352 can be set to gradually increase from the left. This brings an effect that the outer glow display is gradually shifted to correspond to the page shift using an outline of the second page indicator 352 as a frame or mask.

According to the present invention, when an image displayed on an image region is a prescribed partial image of a whole image, in case of receiving an input of a touch and drag action on the image region, the mobile terminal 100 scrolls the whole image within the image region and is then able to set an image, which is to be displayed on the image region, to another partial image of the whole image as a result of the scroll under the control of the controller 180.

This is explained in detail with reference to FIG. 20A and FIG. 20B as follows.

Figure 20A:
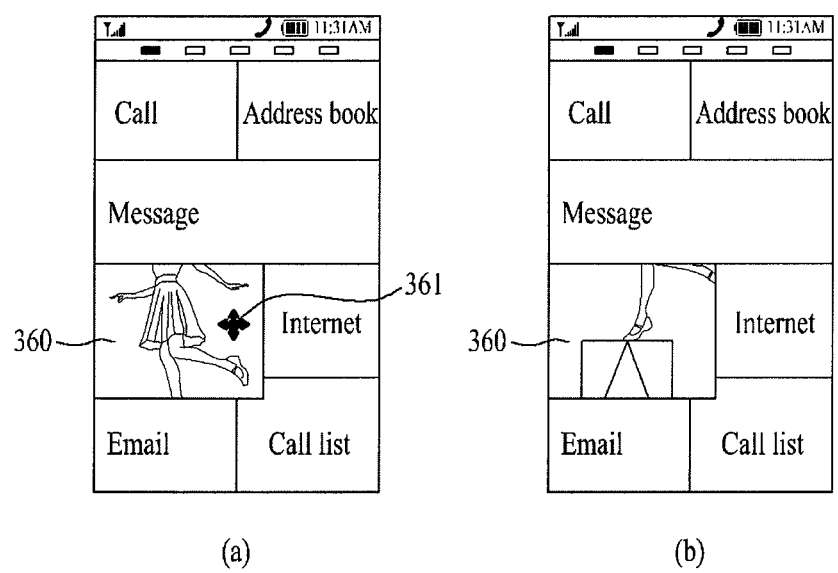
FIG. 20A and FIG. 20B are diagrams of screen configurations for controlling a display of an image region according to the present invention.
Figure 20B:
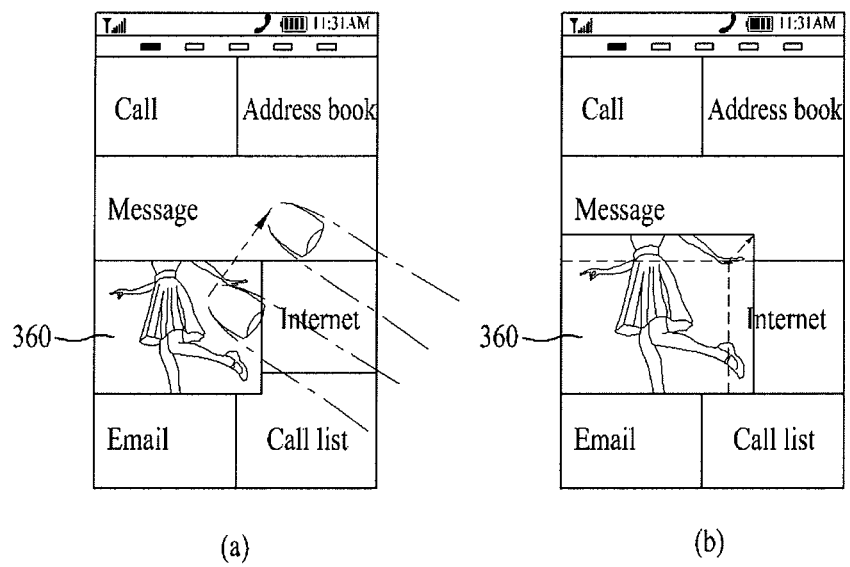

FIG. 20A and FIG. 20B are diagrams of screen configurations for controlling a display of an image region according to the present invention.

Referring to FIG. 20A, the mobile terminal 100 displays a partial image of a whole image within an image region 360. In case of receiving an input of an image scroll command signal for the image region 360 from a user, the mobile terminal 100 is able to display a scroll indicator 361 within the image region (a).

Hence, if a user manipulates the scroll indicator 361, the mobile terminal 100 is able to scroll the whole image within the image region 360. The mobile terminal 100 is then able to set an image of the image region 360 to another partial image searched as a result of the scroll (b).

Of course, even if the scroll indicator 361 is not displayed, in case of receiving a touch and drag action from one point of the image region 360 to another point, the mobile terminal 100 is able to scroll the whole image within the image region 360.

Referring to FIG. 20B, the mobile terminal 100 is able to adjust a size of the image region 360 to correspond to the touch and drag action inputted from a user under the control of the controller 180.

For instance, in case of receiving an input of a touch and drag action from one point within the image region 360 to one point outside the image region 360 (a), the mobile terminal 100 is able to enlarge a size of the image region 360 to correspond to the touch and drag action inputted from a user (not shown in the drawing).

Moreover, the mobile terminal 100 applies the above-described embodiment to a specific menu item as well as the image region 360 and is then able to enlarge or reduce a size of the specific menu item.

Accordingly, the present invention provides the following effects and/or advantages.

First of all, in case that a first menu item on a first line is shifted to a second line to be arranged thereon, the present invention is able to adjust a per-menu item horizontal length ratio of the first line to the second line.

Secondly, in case that a first menu item on a first line is shifted to a second line to be arranged thereon, the first menu item is deleted from the first line and can be then added to the second line.

Thirdly, in case that a first menu item on a first line is shifted to a second line to be arranged thereon, since the first menu item can be included in addition to a menu item previously included in the second line, the menu item previously included in the second line is not shifted to another line due to the arrangement of the first menu item.

According to one embodiment of the present invention, the above-described mobile terminal and menu screen organizing method therein can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a touchscreen configured to display a menu screen including a plurality of lines, each line having at least one menu item arranged therein; and
   a controller configured to detect an input of a touch and drag action from a first point of a first line included in the plurality of the lines to a second point of a second line included in the plurality of the lines, and to arrange a first menu item having the first point belonging thereto by shifting the first menu item to a position corresponding to the second point in the second line,
   wherein a predetermined one of a plurality of the lines includes an image region which is continually assigned to the predetermined one of the plurality of lines unlike the at least one menu item that is shiftable, wherein the second line includes, after shifting, the first menu item in addition to the at least one menu item included before the shifting of the first menu item, wherein, after completion of the shift of the first menu item, the controller adjusts a size and position per menu item for each of the first and second lines based on a user selected number of menu items included in each line, wherein the image region is displayed as a menu item, wherein the predetermined one of the plurality of the lines further includes one of the at least one menu item that is shiftable, wherein when only one menu item remains in the first line after completion of the shift of the first menu item, the controller adjusts a size and position of the remaining menu item so the remaining menu item is displayed on a whole display region of the first line, wherein a vertical length of the first line after completion of the shift of the first menu item corresponds to a vertical length of the remaining menu item, regardless of a position of at least one menu item included in a line adjacent to the first line, wherein the controller is further configured to display the first menu item with a first brightness based on a touch of the first menu item for a first time duration, in which a function corresponding to the first menu item with the first brightness can be executed, and display the first menu item with a second brightness brighter than the first brightness based on the touch of the menu item for a second time duration longer than the first time duration, in which the first menu item can be shifted to another line.

2. The mobile terminal of claim 1, wherein the controller sets the number of lines included in the menu screen.

3. The mobile terminal of claim 1, wherein the controller sets at least one of a horizontal length ratio for the menu items included in one line of the plurality of lines and a vertical length ratio for each line of the plurality of the lines.

4. The mobile terminal of claim 1, wherein the touchscreen is configured to receive an input for a touch action corresponding to a shiftable state setting for the first menu item, and
   wherein, if receiving the input for the touch action, the controller sets a shiftable state for the first menu item.

5. The mobile terminal of claim 4, wherein the menu screen includes a plurality of pages,
   wherein the controller is configured to perform a page turning action while the first menu items is in the shiftable state, and
   wherein, under the control of the controller, the touchscreen displays a different page corresponding to the page turning action and displays the first menu item in the shiftable state within the different page.

6. The mobile terminal of claim 5, wherein, if the touch screen receives a touch and drag action from the first menu item to a random point of a specific line of a plurality of lines included in the different page, the controller arranges the first menu item by shifting the first menu item to a position corresponding to the random point in the specific line.

7. The mobile terminal of claim 1, wherein, under the control of the controller, the touchscreen is configured to shift and display a copy of the first menu item along a path of the touch and drag action.

8. The mobile terminal of claim 1, wherein, under the control of the controller, the touchscreen is configured to display an indicator indicating an arrangeable position in all lines in which the first menu item is arrangeable among the plurality of the lines in the course of the touch and drag action.

9. The mobile terminal of claim 1, wherein, if an image displayed in the image region includes a predetermined partial image of a whole image, the touchscreen is configured to scroll the whole image if receiving an input of a touch and drag action on the image region, and
   wherein the controller sets the image to be displayed in the image region to a different partial image of the whole image as a result of the scroll.

10. The mobile terminal of claim 1, wherein the menu screen includes a plurality of pages, and, under the control of the controller, the touchscreen is configured to display a page indicator corresponding to each page of the plurality of the pages on a predetermined region of the touchscreen.

11. The mobile terminal of claim 1, wherein the controller is further configured to display an indicator after the first menu item has been selected and shifted from the first line at least partially to the second line, the indicator indicating a position the first menu item would be displayed in the second line, and
   wherein the indicator is displayed on a first or second side of a menu item already displayed in the second line and the first menu item is displayed on the corresponding first or second side of the menu item already displayed in the second line based on a release of the touch.

12. A method of organizing a menu screen in a mobile terminal comprising:
   displaying, by a touchscreen of the mobile terminal, the menu screen including a plurality of lines, each line having at least one menu item arranged therein;
   receiving an input of a touch and drag action from a first point of a first line included in the plurality of the lines to a second point of a second line included in the plurality of the lines; and
   arranging a first menu item having the first point belong thereto by shifting the first menu item to a position corresponding to the second point in the second line,
   wherein a predetermined one of the plurality of the lines includes an image region which is continually assigned to the predetermined one of the plurality of the lines unlike the at least one menu item that is shiftable,
   wherein the second line includes, after shifting, the first menu item in addition to the at least one menu item included before the shifting of the first menu item,
   wherein, after completion of the shift of the first menu item, the method further comprises adjusting a size and position per menu item for each of the first and second lines based on a user selected number of menu items included in each line,
   wherein the image region is displayed as a menu item,
   wherein the predetermined one of the plurality of the lines further includes one of the at least one menu item that is shiftable,
   wherein the step of adjusting a size and position per menu item for each of the first and second lines comprises, when only one menu item remains in the first line after completion of the shift of the first menu item, adjusting a size and position of the remaining menu item so the remaining menu item is displayed on a whole display region of the first line,
   wherein a vertical length of the first line after completion of the shift of the first menu item corresponds to a vertical length of the remaining menu item, regardless of a position of at least one menu item included in a line adjacent to the first line,
   wherein the method further comprises displaying the first menu item with a first brightness based on a touch of the first menu item for a first time duration, in which a function corresponding to the first menu item with the first brightness can be executed, and displaying the first menu item with a second brightness brighter than the first brightness based on the touch of the menu item for a second time duration longer than the first time duration, in which the first menu item can be shifted to another line.

13. The method of claim 12, further comprising:
receiving an input for a touch action corresponding to a shiftable state setting for the first menu item; and
setting a shiftable state for the first menu item upon receiving the input for the touch action.

14. The method of claim 13, wherein the menu screen includes a plurality of pages, the method further comprising:
performing a page turning action during the shiftable state of the first menu item;
displaying a different page of the menu screen corresponding to the page turning action; and
displaying the first menu item in the shiftable state within the different page.

15. The method of claim 12, further comprising displaying an indicator indicating an arrangeable position in all lines in which the first menu item is arrangeable among the plurality of the lines in the course of the touch and drag action.

16. The method of claim 12, wherein the image displayed in the image region includes a predetermined partial image of a whole image, the method further comprising:
scrolling the whole image while receiving an input of a touch and drag action on the image region; and
setting the image to be displayed in the image region to a different partial image of the whole image as a result of the scrolling step.

17. The method of claim 12, wherein the menu screen includes a plurality of pages, the method further comprising displaying a page indicator corresponding to each page of the plurality of the pages on a predetermined region of the touchscreen.

18. The method of claim 17, further comprising distinguishably displaying the page indicator corresponding a first displayed page of the plurality of pages.

19. The method of claim 17, further comprising:
detecting a touch action on the page indicator corresponding to a second page of the plurality of pages while displaying a first page of the plurality of pages; and
displaying the second page on the touchscreen.

20. The method of claim 17, further comprising:
receiving an input of a touch action for commanding a page turning; and
displaying the page corresponding to the inputted touch action for commanding the page turning.

21. The method of claim 12, further comprising:
displaying an indicator after the first menu item has been selected and shifted from the first line at least partially to the second line, the indicator indicating a position the first menu item would be displayed in the second line,
wherein the indicator is displayed on a first or second side of a menu item already displayed in the second line and the first menu item is displayed on the corresponding first or second side of the menu item already displayed in the second line based on a release of the touch.

* * * * *